(12) United States Patent
Zhang et al.

(10) Patent No.: US 12,301,511 B2
(45) Date of Patent: May 13, 2025

(54) COMMUNICATION METHOD AND APPARATUS

(71) Applicant: HUAWEI TECHNOLOGIES CO., LTD., Guangdong (CN)

(72) Inventors: Zhanzhan Zhang, Shanghai (CN); Xiaolei Tie, Shanghai (CN); Han Zhou, Shanghai (CN); Wenwen Huang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 400 days.

(21) Appl. No.: 17/669,445

(22) Filed: Feb. 11, 2022

(65) Prior Publication Data

US 2022/0166594 A1 May 26, 2022

Related U.S. Application Data

(63) Continuation of application No. PCT/CN2020/108960, filed on Aug. 13, 2020.

(30) Foreign Application Priority Data

Aug. 14, 2019 (CN) .......................... 201910749650.9

(51) Int. Cl.
*H04L 5/00* (2006.01)
*H04W 72/044* (2023.01)
*H04W 72/23* (2023.01)

(52) U.S. Cl.
CPC .......... *H04L 5/0092* (2013.01); *H04L 5/0082* (2013.01); *H04W 72/044* (2013.01); *H04W 72/23* (2023.01)

(58) Field of Classification Search
CPC ..... H04W 72/23; H04W 80/08; H04W 52/16; H04W 52/146; H04W 52/325;
(Continued)

(56) References Cited

U.S. PATENT DOCUMENTS 10,721,765 B2 * 7/2020 Park .................. H04W 72/0453
10,805,872 B2 * 10/2020 Yi .......................... H04L 5/0035
(Continued)

FOREIGN PATENT DOCUMENTS

| CN | 109586881 A | 4/2019 |
|----|-------------|--------|
| WO | 2019061145 A1 | 4/2019 |
| WO | 2019099659 A1 | 5/2019 |

OTHER PUBLICATIONS

Catt, Power saving scheme with UE adaptation to maximum MIMO layer, 3GPP TSG-RAN WG2 Meeting #97, R1-1906354, Reno, USA, May 13-17, 2019, 2 pages.
(Continued)

*Primary Examiner* — Jung Liu

(57) ABSTRACT

The technology of this application relates to a communication method and apparatus. The method includes a terminal device sending first indication information to a network device, where the first indication information indicates that a switching delay between a first bandwidth part BWP and a second BWP is first duration, where the first BWP and the second BWP are uplink BWPs or downlink BWPs used by the terminal device to send and receive data. The terminal device can indicate to the network device a specific switching delay between two BWPs in a serving cell, so that a BWP switching delay determining method is more flexible and a result is more accurate.

17 Claims, 8 Drawing Sheets

(58) Field of Classification Search
CPC . H04W 52/36; H04W 52/281; H04W 52/346; H04L 27/2646; H04L 5/0044; H04L 5/0092; H04L 5/0053; H04L 27/2636
See application file for complete search history.

(56) References Cited

U.S. PATENT DOCUMENTS

| | | | | |
|---|---|---|---|---|
| 10,887,906 | B2* | 1/2021 | Ang | H04L 5/0078 |
| 10,959,271 | B2* | 3/2021 | Yi | H04W 72/20 |
| 11,006,442 | B2* | 5/2021 | Salah | H04L 5/0091 |
| 11,356,229 | B2* | 6/2022 | Jeon | H04L 5/0051 |
| 11,864,122 | B2* | 1/2024 | Fu | H04W 52/325 |
| 2019/0044689 | A1* | 2/2019 | Yiu | H04W 72/23 |
| 2019/0082425 | A1* | 3/2019 | Li | H04L 5/0055 |
| 2019/0104543 | A1 | 4/2019 | Park | |
| 2019/0132845 | A1 | 5/2019 | Babaei et al. | |
| 2019/0141695 | A1 | 5/2019 | Babaei et al. | |
| 2019/0254056 | A1* | 8/2019 | Salah | H04W 72/1263 |
| 2019/0349815 | A1* | 11/2019 | Tiirola | H04W 72/12 |
| 2020/0107345 | A1* | 4/2020 | Ang | H04L 1/0026 |
| 2020/0221384 | A1* | 7/2020 | Ang | H04W 76/28 |
| 2021/0136697 | A1* | 5/2021 | Fu | H04W 72/23 |
| 2021/0376990 | A1* | 12/2021 | Cirik | H04L 5/0053 |
| 2021/0377988 | A1* | 12/2021 | Zhou | H04L 5/0096 |
| 2023/0079660 | A1* | 3/2023 | Fu | H04W 80/08 370/329 |
| 2024/0072979 | A1* | 2/2024 | Jeon | H04W 24/08 |

OTHER PUBLICATIONS

Huawei, HiSilicon, RRM requirement on BWP switching, 3GPP TSG-RAN WG4 Meeting #87, R4-1807347, Busan, Korea, May 21-25, 2018, 4 pages.
International Search Report and Written Opinion issued in PCT/CN2020/108960, dated Oct. 28, 2020, 9 pages.
Extended European Search Report issued in EP20852654.1, dated Sep. 6, 2022, 7 pages.

* cited by examiner

COMMUNICATION METHOD AND APPARATUS

CROSS-REFERENCE TO RELATED APPLICATIONS

This application is a continuation of International Application No. PCT/CN2020/108960, filed on Aug. 13, 2020, which claims priority to Chinese Patent Application No. 201910749650.9, filed on Aug. 14, 2019. The disclosures of the aforementioned applications are hereby incorporated by reference in their entireties.

TECHNICAL FIELD

This application relates to the field of wireless communication technologies, and in particular, to a communication method and apparatus.

BACKGROUND

To adapt to more diversified scenarios and service requirements, a 5th generation (5G) new radio (NR) system introduces a concept of a bandwidth part (BWP). In a cell, a network device may configure one or more downlink BWPs and one or more uplink BWPs for a terminal device, to meet use requirements of the terminal device for different services. When the terminal device switches between different BWPs, the network device needs to reserve a specific amount of processing time for the terminal device. The processing time may be referred to as a BWP switching delay ($T_{BWPswitchDelay}$), and the terminal device does not send or receive data within the switching delay.

In a conventional technology, a terminal device reports its capability parameter (bwp-SwitchingDelay) to a network device, where the capability parameter can indicate whether a BWP switching delay capability type of the terminal device is a type 1 or a type 2. The network device may determine a switching delay of the terminal device between any two BWPs in a cell based on the BWP switching delay capability type. However, the foregoing switching delay determining method is not flexible enough, and a determining result may be inaccurate. For example, for switching between two BWPs, a switching delay determined by the network device based on the BWP switching delay capability type may be excessively large. In this case, even if the terminal device can complete BWP switching in a shorter time period, the network device cannot schedule the terminal device faster. This increases a data service delay and decreases a throughput.

SUMMARY

This application provides a communication method and apparatus, to flexibly indicate a BWP switching delay, so that a terminal device and a network device can perform data transmission more efficiently.

According to a first aspect, a communication method is provided. The method may be performed by a terminal device, or may be performed by a chip or a circuit disposed in the terminal device. This is not limited in this application.

The method includes: the terminal device sending first indication information to a network device, where the first indication information indicates that a switching delay between a first bandwidth part BWP and a second BWP is first duration, where the first BWP and the second BWP are uplink BWPs or downlink BWPs used by the terminal device to send and receive data.

Compared with a case in which the terminal device reports a BWP switching delay capability type of the terminal device and the network device determines a switching delay between any two BWPs in a serving cell, in this embodiment of this application, the terminal device can indicate to the network device a switching delay between two BWPs in a plurality of BWPs (including a configured BWP and a BWP that is about to be configured) in a serving cell, and the network device can determine the BWP switching delay based on the indication. Therefore, a BWP switching delay determining (e.g., indicating) method is more flexible, and a result is more accurate. When the terminal device performs switching between the two BWPs, switching may be performed based on the reported switching delay, so that the terminal device and the network device can perform data transmission more efficiently.

With reference to the first aspect, in some implementations of the first aspect, the first indication information includes an identifier of the first BWP, an identifier of the second BWP, and indication information of the first duration.

Optionally, an identifier of a BWP may be a BWP identifier. For example, if the identifiers of the first BWP and the second BWP are BWP ID 1 and BWP ID 2 respectively, the first indication information may include BWP ID 1 and BWP ID 2.

It should be understood that in this application, the identifiers of the first BWP and the second BWP may alternatively exist in another form, in addition to the foregoing BWP IDs. This is not limited in this application. Specifically, for the first BWP or the second BWP, any information that can be used to identify the first BWP or the second BWP may be considered as the identifier of the first BWP or the second BWP.

That is, the identifier of the first BWP or the second BWP may alternatively be other information of the first BWP or the second BWP. For example, information that can distinguish the first BWP from another BWP may be used as the identifier of the first BWP, and information that can distinguish the second BWP from another BWP may be used as the identifier of the second BWP.

For example, the identifier of the first BWP or the second BWP may be a configuration parameter of the BWP, for example, may be at least one piece of information such as a subcarrier spacing (or a value of $\mu$), a center frequency, or a bandwidth.

For example, if values of $\mu$ of a plurality of BWPs other than the first BWP in a current first serving cell are 1, and a value of $\mu$ of the first BWP is 2, the value 2 of $\mu$ may be used as the identifier of the first BWP.

With reference to the first aspect, in some implementations of the first aspect, before the terminal device sends the first indication information to the network device, the method further includes: the terminal device determines the first duration.

With reference to the first aspect, in some implementations of the first aspect, the first BWP and the second BWP are any two of a plurality of downlink BWPs configured by the network device for the terminal device in the first serving cell, or the first BWP and the second BWP are any two of a plurality of uplink BWPs configured by the network device for the terminal device in the first serving cell.

With reference to the first aspect, in some implementations of the first aspect, at least one BWP in the first BWP and the second BWP is a BWP that the terminal device recommends the network device to configure for the terminal device in the first serving cell.

It should be understood that, in this application, the BWP that the terminal device recommends the network device to configure for the terminal device includes a BWP that is about to be configured but has not been completely configured.

For example, the at least one BWP may be a BWP that the terminal device recommends the network device to configure for the terminal device but that has not been completely configured.

With reference to the first aspect, in some implementations of the first aspect, the method further includes: the terminal device sends second indication information to the network device, where the second indication information indicates a recommended configuration parameter of the at least one BWP.

With reference to the first aspect, in some implementations of the first aspect, the method further includes: The terminal device receives a reconfiguration message sent by the network device, where the reconfiguration message is used to configure the at least one BWP for the terminal device based on the recommended configuration parameter.

With reference to the first aspect, in some implementations of the first aspect, the first duration is shorter than second duration, and the second duration is a switching delay that is between the first BWP and the second BWP and that is determined based on a BWP switching delay capability type of the terminal device. It can be learned from the foregoing description that the switching delay determined by using the BWP switching delay capability type may be excessively long (where the terminal device may not need that long time to perform BWP switching). In this application, the first duration can be shorter than the second duration, and the terminal device can complete BWP switching faster, so that the terminal device and the network device can implement data transmission faster, thereby reducing a data service delay and improving a data throughput.

With reference to the first aspect, in some implementations of the first aspect, the terminal device determines the first duration based on configuration parameters of the first BWP and the second BWP.

Optionally, the configuration parameter may include at least one of a bandwidth, a center frequency, and a subcarrier spacing.

With reference to the first aspect, in some implementations of the first aspect, the configuration parameters of the first BWP and the second BWP meet at least one of the following conditions: a difference between center frequencies of the first BWP and the second BWP is less than or equal to a first threshold; a difference between bandwidths of the first BWP and the second BWP is less than or equal to a second threshold; and a difference between subcarrier spacings of the first BWP and the second BWP is less than or equal to a third threshold.

Optionally, the first threshold, the second threshold, and the third threshold may be specified in a protocol or a system, may be agreed upon between the network device and the terminal device, or may be determined by the terminal device based on a capability of the terminal device. This is not limited in this application.

Optionally, the first threshold, the second threshold, and the third threshold may be 0. In this case, the configuration parameters of the first BWP and the second BWP may meet at least one of the following conditions: The center frequencies of the first BWP and the second BWP are the same; the bandwidths of the first BWP and the second BWP are the same; and the subcarrier spacings of the first BWP and the second BWP are the same.

With reference to the first aspect, in some implementations of the first aspect, the method further includes: the terminal device receives an acknowledgment message sent by the network device, where the acknowledgment message indicates that the switching delay of the terminal device between the first BWP and the second BWP is the first duration.

Optionally, the acknowledgment message may be carried in any one of the following messages: a radio resource control (RRC) message, a media access control control element (MAC CE) message, or a layer 1 message.

Optionally, the RRC message may include but is not limited to any one of the following messages: an RRC setup message, an RRC reject message, an RRC reconfiguration message, an RRC reestablishment message, an RRC release message, and an RRC resume message.

Optionally, the layer 1 message includes downlink control information (DCI).

With reference to the first aspect, in some implementations of the first aspect, the first serving cell is any one of a plurality of serving cells of the terminal device, and the first indication information further includes a cell identifier of the first serving cell.

With reference to the first aspect, in some implementations of the first aspect, the indication information of the first duration includes a value of the first duration or an index value of the first duration.

With reference to the first aspect, in some implementations of the first aspect, the first indication information further indicates that a switching delay between a third BWP and a fourth BWP is third duration.

Optionally, the third duration may be or may not be equal to the first duration.

Optionally, the third duration is equal to the first duration. In this case, the first indication information may carry the identifiers of the first BWP and the second BWP, identifiers of the third BWP and the fourth BWP, and indication information of one segment of duration, so that signaling overheads can be reduced. In this case, the first indication information further needs to include a corresponding association relationship, to help the network device determine two BWPs between which the indication information of the segment of duration is specifically applicable to switching.

Optionally, if the terminal device and the network device are in a time division duplex (TDD) system, the third BWP may be a BWP bound to the first BWP, that is, BWP identifiers of the third BWP and the first BWP are the same, where one indicates an uplink BWP and the other indicates a downlink BWP; and the fourth BWP may be a BWP bound to the second BWP, that is, BWP identifiers of the fourth BWP and the second BWP are the same, where one indicates an uplink BWP and the other indicates a downlink BWP. An advantage of the foregoing configuration is that, for the TDD system, when the first BWP and the second BWP are used in switching, BWPs bound to the first BWP also need to be used in switching. In this case, switching delays of two pairs of uplink and downlink switching may be indicated simultaneously.

Optionally, one of the third BWP and the fourth BWP may be a same BWP as one of the first BWP and the second BWP.

According to a second aspect, a communication method is provided. The method may be performed by a network device, or may be performed by a chip or a circuit disposed in the network device. This is not limited in this application.

The method includes: the network device receives first indication information sent by a terminal device, where the first indication information indicates that a switching delay between a first bandwidth part BWP and a second BWP is first duration, where the first BWP and the second BWP are uplink BWPs or downlink BWPs used by the terminal device to send and receive data.

With reference to the second aspect, in some implementations of the second aspect, the first indication information includes an identifier of the first BWP, an identifier of the second BWP, and indication information of the first duration.

With reference to the second aspect, in some implementations of the second aspect, the first duration is determined by the terminal device.

With reference to the second aspect, in some implementations of the second aspect, the first BWP and the second BWP are any two of a plurality of downlink BWPs or a plurality of uplink BWPs configured by the network device for the terminal device in a first serving cell.

With reference to the second aspect, in some implementations of the second aspect, at least one BWP in the first BWP and the second BWP is a BWP that the terminal device recommends the network device to newly configure for the terminal device in the first serving cell.

With reference to the second aspect, in some implementations of the second aspect, the method further includes: the network device receives second indication information sent by the terminal device, where the second indication information indicates a recommended configuration parameter of the at least one BWP.

With reference to the second aspect, in some implementations of the second aspect, the method further includes: The network device sends a reconfiguration message to the terminal device, where the reconfiguration message is used to configure the at least one BWP for the terminal device based on the recommended configuration parameter.

With reference to the second aspect, in some implementations of the second aspect, the first duration is shorter than second duration, and the second duration is a switching delay that is between the first BWP and the second BWP and that is determined based on a BWP switching delay capability type of the terminal device.

With reference to the second aspect, in some implementations of the second aspect, the first duration is determined based on configuration parameters of the first BWP and the second BWP.

With reference to the second aspect, in some implementations of the second aspect, the configuration parameters of the first BWP and the second BWP meet at least one of the following conditions: a difference between center frequencies of the first BWP and the second BWP is less than or equal to a first threshold; a difference between bandwidths of the first BWP and the second BWP is less than or equal to a second threshold; and a difference between subcarrier spacings of the first BWP and the second BWP is less than or equal to a third threshold.

With reference to the second aspect, in some implementations of the second aspect, the method further includes: the network device sends an acknowledgment message to the terminal device, where the acknowledgment message indicates that the switching delay of the terminal device between the first BWP and the second BWP is the first duration.

With reference to the second aspect, in some implementations of the second aspect, the first serving cell is any one of a plurality of serving cells of the terminal device, and the first indication information further includes a cell identifier of the first serving cell.

With reference to the second aspect, in some implementations of the second aspect, the indication information of the first duration includes a value of the first duration or an index value of the first duration.

With reference to the second aspect, in some implementations of the second aspect, the first indication information further indicates that a switching delay between a third BWP and a fourth BWP is third duration.

According to a third aspect, a communication method is provided. The method may be performed by a terminal device, or may be performed by a chip or a circuit disposed in the terminal device. This is not limited in this application.

The method includes: the terminal device determines a first quantity of multiple-input and multiple-output (MIMO) layers, where the first quantity of MIMO layers is a maximum quantity of MIMO layers applicable to a first bandwidth part BWP, and the first BWP is an uplink BWP or a downlink BWP used by the terminal device to send and receive data in a first serving cell; and the terminal device sends first indication information to a network device, where the first indication information includes an identifier of the first BWP and indication information of the first quantity of MIMO layers.

Compared with a case in which the terminal device reports a maximum quantity of MIMO layers at a cell granularity (where the maximum quantity of MIMO layers applies to all BWPs in the cell), in this embodiment of this application, the terminal device can determine a maximum quantity of MIMO layers of a specific BWP in a serving cell and indicate the maximum quantity of MIMO layers to the network device, so that indication of the maximum quantity of MIMO layers is more flexible and an indication result is more accurate. When the first BWP is activated, the terminal device may use a more matched quantity of MIMO layers as a maximum quantity of MIMO layers to send and receive data. This can improve performance of data transmission between the terminal device and the network device, and can reduce power consumption of the terminal device because the terminal device can disable some unnecessary antennas.

Optionally, the first BWP may be any one of a plurality of BWPs configured for the terminal device in the first serving cell.

Optionally, the first BWP may be any one of a plurality of downlink BWPs.

Optionally, the first BWP may be any one of a plurality of uplink BWPs.

Optionally, the first BWP may be an initial BWP.

Optionally, the first BWP may be a default BWP.

Optionally, the first BWP may be a BWP that the terminal device recommends the network device to newly configure for the terminal device in the first serving cell.

Optionally, the first quantity of MIMO layers is applicable only to the first BWP, and the first quantity of MIMO layers is inapplicable to another BWP in the first serving cell.

Optionally, the indication information of the first quantity of MIMO layers may include a value of the first quantity of MIMO layers.

Optionally, the first indication information may be sent by using any one of a plurality of uplink BWPs in the first serving cell.

Optionally, the first BWP may be an uplink BWP, and the first indication information may be sent in the first BWP.

Optionally, the terminal device may be in a carrier aggregation scenario, that is, the terminal device may have a plurality of serving cells, and the first indication information may be sent by using any serving cell other than the first serving cell in the plurality of serving cells.

For example, the first indication information may be sent by using any uplink BWP in a serving cell other than the first serving cell.

With reference to the third aspect, in some implementations of the third aspect, the first quantity of MIMO layers is less than a second quantity of MIMO layers, and the second quantity of MIMO layers is a maximum quantity of MIMO layers configured by the network device for the first serving cell. In this embodiment of this application, the terminal device determines the maximum quantity of MIMO layers for the first BWP (that is, determines the first quantity of MIMO layers), where the first quantity of MIMO layers is less than the second quantity of MIMO layers. Therefore, when the first BWP is activated, a more matched quantity of MIMO layers can be used as the maximum quantity of MIMO layers to send and receive data, to improve data transmission performance of the terminal device. In addition, in this case, the terminal device may disable some unnecessary antennas (that is, the terminal device may use fewer antennas), thereby reducing energy consumption of the terminal device.

Optionally, the first BWP is a downlink BWP, and the second quantity of MIMO layers is a maximum quantity of MIMO layers configured for the terminal device in the first serving cell, for receiving a Physical Downlink Shared Channel (PDSCH).

Optionally, the first BWP is an uplink BWP, and the second quantity of MIMO layers is a maximum quantity of MIMO layers configured for the terminal device in the first serving cell, for sending a Physical Uplink Shared Channel (PUSCH).

With reference to the third aspect, in some implementations of the third aspect, the first quantity of MIMO layers is less than a third quantity of MIMO layers, and the third quantity of MIMO layers is a maximum quantity of MIMO layers indicated in a capability message reported by the terminal device for the first serving cell.

Optionally, the first BWP is a downlink BWP, and the third quantity of MIMO layers is a maximum quantity of MIMO layers for receiving a PDSCH and indicated in a capability message reported by the terminal device for the first serving cell.

Optionally, the first BWP is an uplink BWP, and the third quantity of MIMO layers is a maximum quantity of MIMO layers for sending a PUSCH and indicated in a capability message reported by the terminal device for the first serving cell.

With reference to the third aspect, in some implementations of the third aspect, the terminal device determines the first quantity of MIMO layers based on a configuration parameter of the first BWP.

Optionally, the configuration parameter may include at least one of a bandwidth, a center frequency, and a subcarrier spacing.

Optionally, the first quantity of MIMO layers may be determined based on a bandwidth of the first BWP. For example, for a BWP with a small bandwidth, a data rate is generally low. In this case, a small first quantity of MIMO layers may be correspondingly configured.

Optionally, the first quantity of MIMO layers may be determined based on a subcarrier spacing of the first BWP. For example, a BWP with a small subcarrier spacing may have a low requirement on a delay. In this case, a small first quantity of MIMO layers may be correspondingly configured.

Optionally, the first quantity of MIMO layers may be determined based on a center frequency of the first BWP. For example, a BWP with a low center frequency may have a low requirement on a delay. In this case, a small first quantity of MIMO layers may be correspondingly configured.

With reference to the third aspect, in some implementations of the third aspect, the method further includes: the terminal device receives an acknowledgment message sent by the network device, where the acknowledgment message indicates that when the terminal device uses the first BWP, the terminal device uses the first quantity of MIMO layers as a maximum quantity of MIMO layers to send and receive data.

With reference to the third aspect, in some implementations of the third aspect, the first serving cell is any one of a plurality of serving cells of the terminal device, and the first indication information further includes a cell identifier of the first serving cell.

With reference to the third aspect, in some implementations of the third aspect, the first indication information includes an identifier of a second BWP and indication information of a fourth quantity of MIMO layers, and the fourth quantity of MIMO layers is a maximum quantity of MIMO layers that is determined by the terminal device and that is applicable to the second BWP.

According to a fourth aspect, a communication method is provided. The method may be performed by a network device, or may be performed by a chip or a circuit disposed in the network device. This is not limited in this application.

The method includes: the network device receives first indication information sent by a terminal device, where the first indication information includes an identifier of a first bandwidth part BWP and indication information of a first quantity of MIMO layers, and the first BWP is an uplink BWP or a downlink BWP used by the terminal device to send and receive data in a first serving cell; and the network device determines, based on the first indication information, that when the first BWP is activated, the terminal device uses the first quantity of MIMO layers as a maximum quantity of MIMO layers to send and receive data.

With reference to the fourth aspect, in some implementations of the fourth aspect, the first quantity of MIMO layers is less than a second quantity of MIMO layers, and the second quantity of MIMO layers is a maximum quantity of MIMO layers configured by the network device for the first serving cell.

With reference to the fourth aspect, in some implementations of the fourth aspect, the first quantity of MIMO layers is less than a third quantity of MIMO layers, and the third quantity of MIMO layers is a maximum quantity of MIMO layers indicated in a capability message reported by the terminal device for the first serving cell.

With reference to the fourth aspect, in some implementations of the fourth aspect, the first quantity of MIMO layers is determined based on a configuration parameter of the first BWP.

With reference to the fourth aspect, in some implementations of the fourth aspect, the method further includes: the network device sends an acknowledgment message to the terminal device, where the acknowledgment message indicates that when the terminal device uses the first BWP, the terminal device uses the first quantity of MIMO layers as a maximum quantity of MIMO layers to send and receive data.

With reference to the fourth aspect, in some implementations of the fourth aspect, the first serving cell is any one of a plurality of serving cells of the terminal device, and the first indication information further includes a cell identifier of the first serving cell.

With reference to the fourth aspect, in some implementations of the fourth aspect, the first indication information includes an identifier of a second BWP and indication information of a fourth quantity of MIMO layers, and the fourth quantity of MIMO layers is a maximum quantity of MIMO layers that is determined by the terminal device and that is applicable to the second BWP.

According to a fifth aspect, a communication method is provided. The method may be performed by a terminal device, or may be performed by a chip or a circuit disposed in the terminal device. This is not limited in this application.

The method includes: the terminal device determines recommended configuration parameters of N BWPs based on first duration and configuration parameters of M BWPs, where the M BWPs are BWPs that have been configured by a network device for the terminal device in a first serving cell, and M and N are integers greater than or equal to 1; the terminal device sends first indication information to the network device, where the first indication information indicates the recommended configuration parameters of the N BWPs; and the terminal device sends second indication information to the network device, where the second indication information indicates that a switching delay between a first BWP and a second BWP is the first duration, and at least one of the first BWP and the second BWP is a BWP newly configured by the network device for the terminal device in the first serving cell based on the recommended configuration parameters of the N BWPs.

According to this embodiment of this application, the terminal device may determine a recommended configuration parameter of at least one BWP based on a specific delay requirement and a currently configured BWP, and report the recommended configuration parameter of the BWP to the network device. The network device may configure at least one new BWP based on the recommended configuration parameter, so that a switching delay between at least two BWPs in the serving cell can meet a use requirement.

With reference to the fifth aspect, in some implementations of the fifth aspect, before the terminal device determines the recommended configuration parameters of the N BWPs based on the first duration and the configuration parameters of the M BWPs, the method further includes: The terminal device determines that switching delays between the M BWPs do not meet the first duration. The terminal device may determine the recommended configuration parameters of the N BWPs only when determining that the switching delays between the M BWPs do not meet the first duration, thereby reducing signaling overheads.

For example, a value of M is 1. In this case, there are no other BWPs that can be used in switching, and the terminal device may determine that the switching delays between the M BWPs do not meet the first duration.

For another example, a value of M may be greater than or equal to 2. In this case, there are a plurality of BWPs available for the terminal device to perform switching, and the terminal device may determine that a switching delay between any two of the M BWPs does not meet the first duration.

Optionally, that the switching delay between any two of the M BWPs does not meet the first duration may be that the switching delay between any two of the M BWPs is not equal to the first duration.

Optionally, that the switching delay between any two of the M BWPs does not meet the first duration may be that the switching delay between any two of the M BWPs is greater than the first duration.

Optionally, that the switching delay between any two of the M BWPs does not meet the first duration may be that the switching delay between any two of the M BWPs is greater than the first duration, and a difference between the first duration and the switching delay is greater than a first threshold.

Optionally, that the switching delay between any two of the M BWPs does not meet the first duration may be that the switching delay between any two of the M BWPs is less than the first duration.

Optionally, that the switching delay between any two of the M BWPs does not meet the first duration may be that the switching delay between any two of the M BWPs is less than the first duration, and a difference between the first duration and the switching delay is greater than a second threshold.

Optionally, the first threshold and the second threshold may be specified in a protocol or a system, may be agreed upon between the network device and the terminal device, or may be determined by the terminal device based on a capability of the terminal device. This is not limited in this application.

With reference to the fifth aspect, in some implementations of the fifth aspect, the method further includes: The terminal device receives an acknowledgment message sent by the network device, where the acknowledgment message indicates that the switching delay of the terminal device between the first BWP and the second BWP is the first duration.

Optionally, the acknowledgment message may be carried in any one of the following messages: an RRC message, a MAC CE message, or a layer 1 message.

Optionally, the RRC message may include but is not limited to any one of the following messages: an RRC setup message, an RRC reject message, an RRC reconfiguration message, an RRC reestablishment message, an RRC release message, and an RRC resume message.

Optionally, the layer 1 message includes DCI.

With reference to the fifth aspect, in some implementations of the fifth aspect, the method further includes: the terminal device receives a reconfiguration message sent by the network device, where the reconfiguration message is used to configure the at least one BWP for the terminal device based on the recommended configuration parameters of the N BWPs.

Optionally, the acknowledgment message includes the reconfiguration message.

With reference to the fifth aspect, in some implementations of the fifth aspect, the recommended configuration parameters of the N BWPs include bandwidth information and center frequency information of the N BWPs.

With reference to the fifth aspect, in some implementations of the fifth aspect, the recommended configuration parameters of the N BWPs include resource indication values corresponding to the N BWPs.

With reference to the fifth aspect, in some implementations of the fifth aspect, the recommended configuration parameters of the N BWPs include subcarrier spacing information of the N BWPs.

With reference to the fifth aspect, in some implementations of the fifth aspect, the first indication information includes an identifier of a reference BWP, and the recommended configuration parameters of the N BWPs include an offset relative to a configuration parameter of the reference BWP.

Optionally, the identifier of the reference BWP is a reference BWP ID, and the reference BWP is a BWP that has been configured by the network device for the terminal device.

Optionally, the identifier of the reference BWP is a configuration parameter of the reference BWP, and the reference BWP is a BWP that has been configured by the network device for the terminal device.

Optionally, the identifier of the reference BWP is a recommended configuration parameter of the reference BWP, and the reference BWP is a BWP that the terminal device recommends the network device to newly configure.

With reference to the fifth aspect, in some implementations of the fifth aspect, that a terminal device determines recommended configuration parameters of N BWPs based on first duration and configuration parameters of M BWPs includes: The terminal device determines the recommended configuration parameters and recommended BWP identifiers of the N BWPs based on the first duration and the configuration parameters of the M BWPs, where the first indication information further includes the recommended BWP identifiers of the N BWPs.

With reference to the fifth aspect, in some implementations of the fifth aspect, the second indication information further indicates that a switching delay between a third BWP and a fourth BWP is second duration.

Optionally, at least one of the third BWP and the fourth BWP is a BWP newly configured by the network device for the terminal device in the first serving cell based on the recommended configuration parameters of the N BWPs.

Optionally, the third BWP and the fourth BWP are any two of a plurality of downlink BWPs or a plurality of uplink BWPs that have been configured by the network device for the terminal device in the first serving cell.

Optionally, the second duration may be or may not be equal to the first duration.

Optionally, the second duration is equal to the first duration. In this case, the second indication information may carry identifiers of the first BWP, the second BWP, the third BWP, and the fourth BWP, and indication information of one segment of duration, so that signaling overheads can be reduced. In this case, the second indication information further needs to include a corresponding association relationship, to help the network device determine two BWPs between which the indication information of the segment of duration is specifically applicable to switching.

Optionally, one of the third BWP and the fourth BWP may be a same BWP as one of the first BWP and the second BWP.

According to a sixth aspect, a communication method is provided. The method may be performed by a network device, or may be performed by a chip or a circuit disposed in the network device. This is not limited in this application.

The method includes: the network device receives first indication information sent by a terminal device, where the first indication information indicates recommended configuration parameters of N BWPs, the recommended configuration parameters of the N BWPs are determined based on first duration and configuration parameters of M BWPs, and the M BWPs are BWPs configured by the network device for the terminal device in a first serving cell, and M and N are integers greater than or equal to 1; the network device receives second indication information sent by the terminal device, where the second indication information indicates that a switching delay between a first BWP and a second BWP is the first duration, and at least one of the first BWP and the second BWP is a BWP newly configured by the network device for the terminal device in the first serving cell based on the recommended configuration parameters of the N BWPs; and the network device determines, based on the second indication information, that the switching delay of the terminal device between the first BWP and the second BWP is the first duration.

With reference to the sixth aspect, in some implementations of the sixth aspect, the method further includes: The network device sends an acknowledgment message to the terminal device, where the acknowledgment message indicates that the switching delay of the terminal device between the first BWP and the second BWP is the first duration.

With reference to the sixth aspect, in some implementations of the sixth aspect, the method further includes: The network device sends a reconfiguration message to the terminal device, where the reconfiguration message is used to configure the at least one BWP for the terminal device based on the recommended configuration parameters of the N BWPs.

With reference to the sixth aspect, in some implementations of the sixth aspect, the recommended configuration parameters of the N BWPs include bandwidth information and center frequency information of the N BWPs.

With reference to the sixth aspect, in some implementations of the sixth aspect, the recommended configuration parameters of the N BWPs include resource indication values corresponding to the N BWPs.

With reference to the sixth aspect, in some implementations of the sixth aspect, the recommended configuration parameters of the N BWPs include subcarrier spacing information of the N BWPs.

With reference to the sixth aspect, in some implementations of the sixth aspect, the first indication information includes an identifier of a reference BWP, and the recommended configuration parameters of the N BWPs include an offset relative to a configuration parameter of the reference BWP.

With reference to the sixth aspect, in some implementations of the sixth aspect, the first indication information further includes recommended BWP identifiers of the N BWPs.

With reference to the sixth aspect, in some implementations of the sixth aspect, the second indication information further indicates that a switching delay between a third BWP and a fourth BWP is second duration.

According to a seventh aspect, a communication apparatus is provided. The communication apparatus includes: a transceiver unit, configured to send first indication information to a network device, where the first indication information indicates that a switching delay between a first bandwidth part BWP and a second BWP is first duration, where the first BWP and the second BWP are uplink BWPs or downlink BWPs used by the communication apparatus to send and receive data.

With reference to the seventh aspect, in some implementations of the seventh aspect, the first indication information includes an identifier of the first BWP, an identifier of the second BWP, and indication information of the first duration.

With reference to the seventh aspect, in some implementations of the seventh aspect, the apparatus further includes a determining unit, configured to determine the first duration before the transceiver unit sends the first indication information to the network device.

With reference to the seventh aspect, in some implementations of the seventh aspect, the first BWP and the second BWP are any two of a plurality of downlink BWPs or a plurality of uplink BWPs configured by the network device for the communication apparatus in a first serving cell.

With reference to the seventh aspect, in some implementations of the seventh aspect, at least one BWP in the first BWP and the second BWP is a BWP that the communication apparatus recommends the network device to newly configure for the communication apparatus in the first serving cell.

With reference to the seventh aspect, in some implementations of the seventh aspect, the transceiver unit is further configured to send second indication information to the network device, where the second indication information indicates a recommended configuration parameter of the at least one BWP.

With reference to the seventh aspect, in some implementations of the seventh aspect, the transceiver unit is further configured to receive a reconfiguration message sent by the network device, where the reconfiguration message is used to configure the at least one BWP for the communication apparatus based on the recommended configuration parameter.

With reference to the seventh aspect, in some implementations of the seventh aspect, the first duration is shorter than second duration, and the second duration is a switching delay that is between the first BWP and the second BWP and that is determined based on a BWP switching delay capability type of the communication apparatus.

With reference to the seventh aspect, in some implementations of the seventh aspect, the transceiver unit is further configured to receive an acknowledgment message sent by the network device, where the acknowledgment message indicates that the switching delay of the communication apparatus between the first BWP and the second BWP is the first duration.

With reference to the seventh aspect, in some implementations of the seventh aspect, the indication information of the first duration includes a value of the first duration or an index value of the first duration.

With reference to the seventh aspect, in some implementations of the seventh aspect, the first indication information further indicates that a switching delay between a third BWP and a fourth BWP is third duration.

With reference to the seventh aspect, in some implementations of the seventh aspect, the determining unit determines the first duration based on configuration parameters of the first BWP and the second BWP.

With reference to the seventh aspect, in some implementations of the seventh aspect, the configuration parameters of the first BWP and the second BWP meet at least one of the following conditions: a difference between center frequencies of the first BWP and the second BWP is less than or equal to a first threshold; a difference between bandwidths of the first BWP and the second BWP is less than or equal to a second threshold; and a difference between subcarrier spacings of the first BWP and the second BWP is less than or equal to a third threshold.

With reference to the seventh aspect, in some implementations of the seventh aspect, the first serving cell is any one of a plurality of serving cells of the communication apparatus, and the first indication information further includes a cell identifier of the first serving cell.

According to an eighth aspect, a communication apparatus is provided. The communication apparatus includes: a transceiver unit, configured to receive first indication information sent by a terminal device, where the first indication information indicates that a switching delay between a first bandwidth part BWP and a second BWP is first duration, where the first BWP and the second BWP are uplink BWPs or downlink BWPs used by the terminal device to send and receive data.

With reference to the eighth aspect, in some implementations of the eighth aspect, the first indication information includes an identifier of the first BWP, an identifier of the second BWP, and indication information of the first duration.

With reference to the eighth aspect, in some implementations of the eighth aspect, the first duration is determined by the terminal device.

With reference to the eighth aspect, in some implementations of the eighth aspect, the first BWP and the second BWP are any two of a plurality of downlink BWPs configured by the network device for the communication apparatus in a first serving cell, or the first BWP and the second BWP are any two of a plurality of uplink BWPs configured by the network device for the communication apparatus in a first serving cell.

With reference to the eighth aspect, in some implementations of the eighth aspect, at least one BWP in the first BWP and the second BWP is a BWP that the terminal device recommends the communication apparatus to configure for the terminal device in a first serving cell.

With reference to the eighth aspect, in some implementations of the eighth aspect, the transceiver unit is further configured to receive second indication information sent by the terminal device, where the second indication information indicates a recommended configuration parameter of the at least one BWP.

With reference to the eighth aspect, in some implementations of the eighth aspect, the transceiver unit is further configured to send a reconfiguration message to the terminal device, where the reconfiguration message is used to configure the at least one BWP for the terminal device based on the recommended configuration parameter.

With reference to the eighth aspect, in some implementations of the eighth aspect, the first duration is shorter than second duration, and the second duration is a switching delay that is between the first BWP and the second BWP and that is determined based on a BWP switching delay capability type of the terminal device.

With reference to the eighth aspect, in some implementations of the eighth aspect, the transceiver unit is further configured to send an acknowledgment message to the terminal device, where the acknowledgment message indicates that the switching delay of the terminal device between the first BWP and the second BWP is the first duration.

With reference to the eighth aspect, in some implementations of the eighth aspect, the indication information of the first duration includes a value of the first duration or an index value of the first duration.

With reference to the eighth aspect, in some implementations of the eighth aspect, the first indication information further indicates that a switching delay between a third BWP and a fourth BWP is third duration.

With reference to the eighth aspect, in some implementations of the eighth aspect, the configuration parameters of the first BWP and the second BWP meet at least one of the following conditions: A difference between center frequencies of the first BWP and the second BWP is less than or equal to a first threshold; a difference between bandwidths of the first BWP and the second BWP is less than or equal to a second threshold; and a difference between subcarrier spacings of the first BWP and the second BWP is less than or equal to a third threshold.

With reference to the eighth aspect, in some implementations of the eighth aspect, the first serving cell is any one of a plurality of serving cells of the communication apparatus, and the first indication information further includes a cell identifier of the first serving cell.

According to a ninth aspect, a communication apparatus is provided. The communication apparatus includes: a determining unit, configured to determine a first quantity of MIMO layers, where the first quantity of MIMO layers is a maximum quantity of MIMO layers applicable to a first bandwidth part BWP, and the first BWP is an uplink BWP or a downlink BWP used by the communication apparatus to send and receive data in a first serving cell; and a transceiver unit, configured to send first indication information to a network device, where the first indication information includes an identifier of the first BWP and indication information of the first quantity of MIMO layers.

With reference to the ninth aspect, in some implementations of the ninth aspect, the first quantity of MIMO layers is less than a second quantity of MIMO layers, and the second quantity of MIMO layers is a maximum quantity of MIMO layers configured by the network device for the first serving cell.

With reference to the ninth aspect, in some implementations of the ninth aspect, the first quantity of MIMO layers is less than a third quantity of MIMO layers, and the third quantity of MIMO layers is a maximum quantity of MIMO layers indicated in a capability message reported by the communication apparatus for the first serving cell.

With reference to the ninth aspect, in some implementations of the ninth aspect, the determining unit determines the first quantity of MIMO layers based on a configuration parameter of the first BWP.

With reference to the ninth aspect, in some implementations of the ninth aspect, the transceiver unit is further configured to receive an acknowledgment message sent by the network device, where the acknowledgment message indicates that when the communication apparatus uses the first BWP, the communication apparatus uses the first quantity of MIMO layers as a maximum quantity of MIMO layers to send and receive data.

With reference to the ninth aspect, in some implementations of the ninth aspect, the first serving cell is any one of a plurality of serving cells of the communication apparatus, and the first indication information further includes a cell identifier of the first serving cell.

With reference to the ninth aspect, in some implementations of the ninth aspect, the first indication information includes an identifier of a second BWP and indication information of a fourth quantity of MIMO layers, and the fourth quantity of MIMO layers is a maximum quantity of MIMO layers that is determined by the determining unit and that is applicable to the second BWP.

According to a tenth aspect, a communication apparatus is provided. The communication apparatus includes: a transceiver unit, configured to receive first indication information sent by a terminal device, where the first indication information includes an identifier of a first bandwidth part BWP and indication information of a first quantity of MIMO layers, and the first BWP is an uplink BWP or a downlink BWP used by the terminal device to send and receive data in a first serving cell; and a determining unit, configured to determine, based on the first indication information, that when the first BWP is activated, the terminal device uses the first quantity of MIMO layers as a maximum quantity of MIMO layers to send and receive data.

With reference to the tenth aspect, in some implementations of the tenth aspect, the first quantity of MIMO layers is less than a second quantity of MIMO layers, and the second quantity of MIMO layers is a maximum quantity of MIMO layers configured by the communication apparatus for the first serving cell.

With reference to the tenth aspect, in some implementations of the tenth aspect, the first quantity of MIMO layers is less than a third quantity of MIMO layers, and the third quantity of MIMO layers is a maximum quantity of MIMO layers indicated in a capability message reported by the terminal device for the first serving cell.

With reference to the tenth aspect, in some implementations of the tenth aspect, the first quantity of MIMO layers is determined based on a configuration parameter of the first BWP.

With reference to the tenth aspect, in some implementations of the tenth aspect, the transceiver unit is further configured to send an acknowledgment message to the terminal device, where the acknowledgment message indicates that when the terminal device uses the first BWP, the terminal device uses the first quantity of MIMO layers as a maximum quantity of MIMO layers to send and receive data.

With reference to the tenth aspect, in some implementations of the tenth aspect, the first serving cell is any one of a plurality of serving cells of the terminal device, and the first indication information further includes a cell identifier of the first serving cell.

With reference to the tenth aspect, in some implementations of the tenth aspect, the first indication information includes an identifier of a second BWP and indication information of a fourth quantity of MIMO layers, and the fourth quantity of MIMO layers is a maximum quantity of MIMO layers that is determined by the terminal device and that is applicable to the second BWP.

According to an eleventh aspect, a communication apparatus is provided. The communication apparatus includes: a determining unit, configured to determine recommended configuration parameters of N BWPs based on first duration and configuration parameters of M BWPs, where the M BWPs are BWPs that have been configured by a network device for the communication apparatus in a first serving cell, and M and N are integers greater than or equal to 1; and a transceiver unit, configured to send first indication information to the network device, where the first indication information indicates the recommended configuration parameters of the N BWPs. The transceiver unit is further configured to send second indication information to the network device, where the second indication information indicates that a switching delay between a first BWP and a second BWP is the first duration, and at least one of the first BWP and the second BWP is a BWP newly configured by the network device for the communication apparatus in the first serving cell based on the recommended configuration parameters of the N BWPs.

With reference to the eleventh aspect, in some implementations of the eleventh aspect, the determining unit is further configured to determine that switching delays between the M BWPs do not meet the first duration.

With reference to the eleventh aspect, in some implementations of the eleventh aspect, the transceiver unit is further configured to receive an acknowledgment message sent by the network device, where the acknowledgment message indicates that the switching delay of the communication apparatus between the first BWP and the second BWP is the first duration.

With reference to the eleventh aspect, in some implementations of the eleventh aspect, the transceiver unit is further configured to receive a reconfiguration message sent by the network device, where the reconfiguration message is used to configure the at least one BWP for the communication apparatus based on the recommended configuration parameters of the N BWPs.

Optionally, the acknowledgment message includes the reconfiguration message.

With reference to the eleventh aspect, in some implementations of the eleventh aspect, the recommended configuration parameters of the N BWPs include bandwidth information and center frequency information of the N BWPs.

With reference to the eleventh aspect, in some implementations of the eleventh aspect, the recommended configuration parameters of the N BWPs include resource indication values corresponding to the N BWPs.

With reference to the eleventh aspect, in some implementations of the eleventh aspect, the first indication information includes an identifier of a reference BWP, and the recommended configuration parameters of the N BWPs include an offset relative to a configuration parameter of the reference BWP.

With reference to the eleventh aspect, in some implementations of the eleventh aspect, the determining unit is further configured to determine the recommended configuration parameters and recommended identifiers of the N BWPs based on the first duration and the configuration parameters of the M BWPs. The first indication information further includes the recommended identifiers of the N BWPs.

According to a twelfth aspect, a communication apparatus is provided. The communication apparatus includes: a transceiver unit, configured to receive first indication information sent by a terminal device, where the first indication information indicates recommended configuration parameters of N BWPs, the recommended configuration parameters of the N BWPs are determined based on first duration and configuration parameters of M BWPs, and the M BWPs are BWPs configured by the communication apparatus for the terminal device in a first serving cell, and M and N are integers greater than or equal to 1; and the transceiver unit is further configured to receive second indication information sent by the terminal device, where the second indication information indicates that a switching delay between a first BWP and a second BWP is the first duration, and at least one of the first BWP and the second BWP is a BWP newly configured by the communication apparatus for the terminal device in the first serving cell based on the recommended configuration parameters of the N BWPs; and a determining unit, configured to determine, based on the second indication information, that the switching delay of the terminal device between the first BWP and the second BWP is the first duration.

With reference to the twelfth aspect, in some implementations of the twelfth aspect, the transceiver unit is further configured to send an acknowledgment message to the terminal device, where the acknowledgment message indicates that the switching delay of the terminal device between the first BWP and the second BWP is the first duration.

With reference to the twelfth aspect, in some implementations of the twelfth aspect, the transceiver unit is further configured to send a reconfiguration message to the terminal device, where the reconfiguration message is used to configure the at least one BWP for the terminal device based on the recommended configuration parameters of the N BWPs.

Optionally, the acknowledgment message includes the reconfiguration message.

With reference to the twelfth aspect, in some implementations of the twelfth aspect, the recommended configuration parameters of the N BWPs include bandwidth information and center frequency information of the N BWPs.

With reference to the twelfth aspect, in some implementations of the twelfth aspect, the recommended configuration parameters of the N BWPs include resource indication values corresponding to the N BWPs.

With reference to the twelfth aspect, in some implementations of the twelfth aspect, the first indication information includes an identifier of a reference BWP, and the recommended configuration parameters of the N BWPs include an offset relative to a configuration parameter of the reference BWP.

According to a thirteenth aspect, a communication apparatus is provided. The apparatus may be a terminal device or a chip in the terminal device. The apparatus may include a processing unit and a transceiver unit. When the apparatus is a terminal device, the processing unit may be a processor, and the transceiver unit may be a transceiver. The terminal device may further include a storage unit, and the storage unit may be a memory. The storage unit is configured to store instructions, and the processing unit executes the instructions stored in the storage unit, so that the terminal device performs the methods in the first, the third, and the fifth aspects. When the apparatus is a chip in a terminal device, the processing unit may be a processor, and the transceiver unit may be an input/output interface, a pin, a circuit, or the like. The processing unit executes instructions stored in a storage unit, so that the terminal device performs the methods in the first, the third, and the fifth aspects. The storage unit may be a storage unit (for example, a register or a cache) in the chip, or may be a storage unit (for example, a read-only memory or a random access memory) that is in the terminal device and that is outside the chip.

According to a fourteenth aspect, a communication apparatus is provided. The apparatus may be a network device, or may be a chip in the network device. The apparatus may include a processing unit and a transceiver unit. When the apparatus is a network device, the processing unit may be a processor, and the transceiver unit may be a transceiver. The network device may further include a storage unit, and the storage unit may be a memory. The storage unit is configured to store instructions, and the processing unit executes the instructions stored in the storage unit, so that the network device performs the methods in the second, the fourth, and the sixth aspects. When the apparatus is a chip in a network device, the processing unit may be a processor, and the transceiver unit may be an input/output interface, a pin, a circuit, or the like. The processing unit executes instructions stored in a storage unit, so that the network device performs the methods in the second, the fourth, and the sixth aspects. The storage unit may be a storage unit (for example, a register or a cache) in the chip, or may be a storage unit (for example, a read-only memory or a random access memory) that is in the network device and that is outside the chip.

According to a fifteenth aspect, a communication apparatus is provided, and includes at least one processor. The at least one processor is coupled to a memory, and is configured to read and execute instructions in the memory, to implement any method in the first aspect to the sixth aspect. Optionally, the communication apparatus further includes the memory.

According to a sixteenth aspect, a computer program product is provided. The computer program product includes computer program code. When the computer program code is run on a computer, the computer is enabled to perform any method in the first aspect to the sixth aspect.

It should be noted that the foregoing computer program code may be completely or partially stored in a first storage medium, where the first storage medium may be packaged with a processor or packaged separately from the processor. This is not specifically limited in this application.

According to a seventeenth aspect, a computer-readable medium is provided. The computer-readable medium stores program code. When the computer program code is run on a computer, the computer is enabled to perform any method in the first aspect to the sixth aspect.

DESCRIPTION OF EMBODIMENTS

The following describes the technical solutions in this application with reference to the accompanying drawings.

The technical solutions in the embodiments of this application may be applied to various communication systems, such as a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunications system (UMTS), a worldwide interoperability for microwave access (WiMAX) communication system, a 5th generation (5G) communication system, a future new radio access technology (NR) system, a narrowband internet of things (NB-IoT) system, and a machine type communication (MTC) system.

Figure 1:
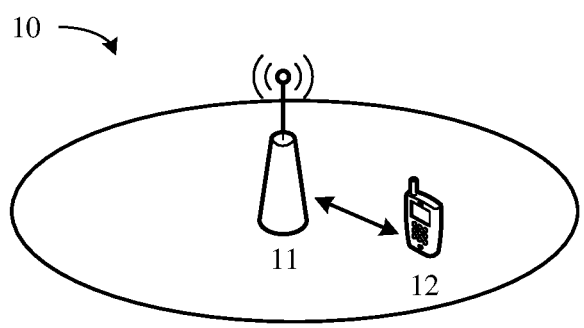
FIG. 1 is an example schematic diagram of a communication system to which an embodiment of this application is applicable.

For ease of understanding of the embodiments of this application, a communication system to which the embodiments of this application are applicable is first described in detail with reference to FIG. 1. FIG. 1 is a schematic diagram of a communication system 10 to which an embodiment of this application is applicable. As shown in FIG. 1, the communication system 10 may include at least one network device, for example, a network device 11 shown in FIG. 1. The communication system 10 may further include at least one terminal device, for example, a terminal device 12 shown in FIG. 1. The network device 11 and the terminal device 12 may communicate with each other through a radio link. A plurality of antennas may be configured for each communication device such as the network device 11 or the terminal device 12. The plurality of antennas may include at least one transmit antenna configured to send a signal and at least one receive antenna configured to receive a signal. In addition, each communication device further additionally includes a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving. Therefore, the network device 11 and the terminal device 12 may communicate with each other by using a multi-antenna technology.

It should be understood that the network device in the wireless communication system may be any device that has a wireless transceiver function. The device includes but is not limited to an evolved NodeB (eNB or eNodeB), a radio network controller (RNC), a NodeB (NB), a base station controller (BSC), a base transceiver station (BTS), a home NodeB (for example, a home evolved NodeB, or a home Node B, HNB), a base band unit (BBU), an access point (AP) in a wireless fidelity (Wi-Fi) system, a wireless relay node, a wireless backhaul node, a transmission point (TP), a transmission reception point (TRP), and the like. Alternatively, the device may be a gNB or a transmission point (TRP or TP) in a 5G system such as an NR system, may be one antenna panel or a group (including a plurality of antenna panels) of antenna panels of a base station in a 5G system, or may be a network node, such as a base band unit (BBU) or a distributed unit (DU), that constitute a gNB or a transmission point.

In some deployments, the gNB may include a centralized unit (CU) and a DU. The gNB may further include a radio unit (RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the CU. It may be understood that the network device may be a CU node, a DU node, or a device including a CU node and a DU node. In addition, the CU may be classified as a network device in an access network (RAN), or may be classified as a network device in a core network (CN). This is not limited in this application.

It should be further understood that the terminal device in the wireless communication system may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. The terminal device in the embodiments of this application may be a mobile phone, a tablet computer, a computer having a wireless transceiver function, a virtual reality (VR) terminal device, an augmented reality (AR) terminal device, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home, or the like. An application scenario is not limited in the embodiments of this application.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an entity for performing a method provided in the embodiments of this application is not particularly limited in the embodiments of this application, provided that the entity can run a program that records code of the method provided in the embodiments of this application to perform communication according to the method provided in the embodiments of this application. For example, the entity for performing the method provided in the embodiments of this application may be a terminal device, a network device, or a function module that is in a terminal device or a network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable device, carrier or medium. For example, a computer-readable medium may include but is not limited to: a magnetic storage component (for example, a hard disk, a floppy disk, or a magnetic tape), an optical disc (for example, a compact disc (CD) and a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to radio channels and various other media that can store, include, and/or carry instructions and/or data.

To facilitate understanding of the embodiments of this application, related technical content in this application is briefly described first.

1. Bandwidth Part

In an NR system, a maximum channel bandwidth of each carrier may reach 400 MHZ. However, bandwidths required by the terminal device to work for different data services are different. For a service with a low data rate or a service that is insensitive to a delay, a terminal device does not need to occupy an entire 400 MHz bandwidth. If the terminal device uses a sampling rate corresponding to the 400 MHz bandwidth, it is undoubtedly a waste of performance. In addition, a large bandwidth means a high sampling rate, and the high sampling rate means high power consumption.

In this context, a bandwidth part (BWP) technology is introduced, and can successfully resolve the foregoing problem.

Bandwidth part (BWP): Because different terminal devices in a same cell in NR may receive different types of data services, and a same terminal device at different moments may also receive different types of data services, a system may configure a corresponding bandwidth for each terminal device. This part of bandwidth configured for the terminal device is referred to as a BWP, and the terminal device transmits data in the BWP. The BWP may be a set of contiguous frequency domain resources on a carrier. Different BWPs may occupy frequency domain resources that partially overlap, or may occupy frequency domain resources that do not overlap. The different BWPs may occupy frequency domain resources in a same bandwidth or different bandwidths. This is not limited in this application.

Each BWP corresponds to one numerical configuration (e.g., numerology), bandwidth, and frequency domain location (e.g., frequency location). For a frequency division duplex (FDD) system or a paired spectrum system, a network device may configure a plurality of downlink BWPs (DL BWPs) and a plurality of uplink BWPs (UL BWPs) for a terminal device. For a time division duplex (TDD) system or an unpaired spectrum system, a network device may configure a plurality of downlink/uplink BWP pairs (DL/UL BWP pairs) for a terminal device. Center frequencies of a DL BWP and a UL BWP in each DL/UL BWP pair are the same, and BWP identifiers are also the same, but bandwidths and subcarrier spacings (SCSs) may be different.

In addition to the BWP configured by the network device by using RRC signaling, there is an initial downlink BWP (initial DL BWP) and an initial uplink BWP (initial UL BWP). Configuration information of the initial downlink BWP and the initial uplink BWP may be included in system information (for example, a system information block 1 (SIB1)), or may be included in an RRC message delivered by a higher layer. After reading the SIB1 in the initial access, the terminal device obtains the configuration information of the initial downlink BWP and the initial uplink BWP. After obtaining the configuration information of the initial downlink/uplink BWP in the SIB1, the terminal device may further obtain configuration information of the initial downlink/uplink BWP from a subsequent RRC message. The configuration information of the initial downlink/uplink BWP in the RRC message may be the same as or different from the configuration information of the initial downlink/uplink BWP in the SIB1, which is not limited in the present technology. In addition to the initial downlink/uplink BWP, the network device may further configure a maximum of four additional downlink/uplink BWPs by using an RRC message. When the network device configures the additional four downlink/uplink BWPs by using the RRC message, the terminal device has a total of five downlink BWPs and five uplink BWPs.

It should be understood that, in another possible implementation, the network device may further configure more than four downlink BWPs and more than four uplink BWPs for the terminal device. For example, the network device configures five, six, seven, eight, or even more downlink/uplink BWPs for the terminal device. This is not limited in this application.

A size of the bandwidth may be a quantity of consecutive physical resource blocks (PRB) included in the BWP, and a frequency domain location may be a location of a center location or a start frequency domain location (a location of a start PRB) of the BWP in a cell bandwidth or carrier bandwidth.

Generally, at a moment in a cell, a terminal device has a maximum of one active downlink BWP and one active uplink BWP, and the terminal device can receive and send data only in the active downlink BWP and the active uplink BWP. For example, for an FDD system or a paired spectrum system, a terminal device may have one active downlink BWP and one active uplink BWP at a moment in a cell. For a TDD system or an unpaired spectrum system, a terminal device may have one active downlink BWP or one active uplink BWP at a moment in a cell.

In addition, in an NR system, a plurality of carriers may be configured for a terminal device by using a carrier aggregation (CA) technology, and the terminal device uses a plurality of serving cells corresponding to the plurality of carriers to send and receive data. On each carrier (e.g., a serving cell), a network device may configure one or more BWPs for the terminal device. Similarly, at a moment, a terminal device may have a maximum of one active downlink BWP and one active uplink BWP on each carrier, and the terminal device can perform data transmission only in the active downlink BWP and/or the active uplink BWP.

The network device may configure a plurality of BWPs for the terminal device, and the terminal device may perform data transmission in any one of the plurality of BWPs. The plurality of BWPs may include an initial BWP.

In addition, the plurality of BWPs may further include a default BWP, and the default BWP is usually a BWP with a relatively small bandwidth. For example, the network device may indicate, from a plurality of BWPs configured in the RRC message, that one BWP is a default BWP. When the terminal device does not receive data for a long time or detects a physical downlink control channel (PDCCH), the terminal device uses a timer (that is, a BWP inactivity timer (BWP-Inactivity Timer)) to switch from a current active BWP to a default BWP to save power. When the network device does not explicitly indicate the default BWP, the terminal device considers the initial BWP as the default BWP.

The plurality of BWPs may be distinguished by using different BWP identifiers (ID). A BWP ID of the initial BWP is 0, and BWP IDs of other BWPs are numbered from 1 to a parameter maxNrofBWPs. For example, in an FDD system or a paired spectrum system, the network device may configure four downlink BWPs for the terminal device, and BWP IDs corresponding to the four downlink BWPs may be 0, 1, 2, and 3 separately.

To support different services, different BWPs may support different numerologies. The numerology is a concept newly introduced into NR, and may be specifically understood as a set of parameters used in a communication system. For example, the numerology may include a subcarrier spacing, a symbol length, a cyclic prefix (CP) length, a resource block (RB) quantity, a slot length, a frame format, and the like. One cell may support one or more numerologies, and one numerology may be configured for one BWP. It should be understood that the enumerated specific content included in the numerology herein is merely used as an example for description, and should not constitute any limitation on this application. For example, the numerology may further include a parameter at another granularity that can be supported in NR.

The NR system may support different SCS configurations, and different SCSs apply to different scenarios. A relatively large SCS may be configured for a high frequency band and a large bandwidth. In addition, a large subcarrier spacing corresponds to a small symbol length in time domain, to meet a requirement of a low-delay service.

For example, SCS configurations supported in the NR system may include 15 kHz, 30 kHz, 60 kHz, 120 kHz, 240 kHz, 480 kHz, and the like.

Symbol lengths corresponding to all subcarrier spacings are different. One slot in NR includes 14 symbols (corresponding to a normal CP) or 12 symbols (corresponding to an extended CP). For different SCSs, an actual time length corresponding to one slot is different.

Figure 2:
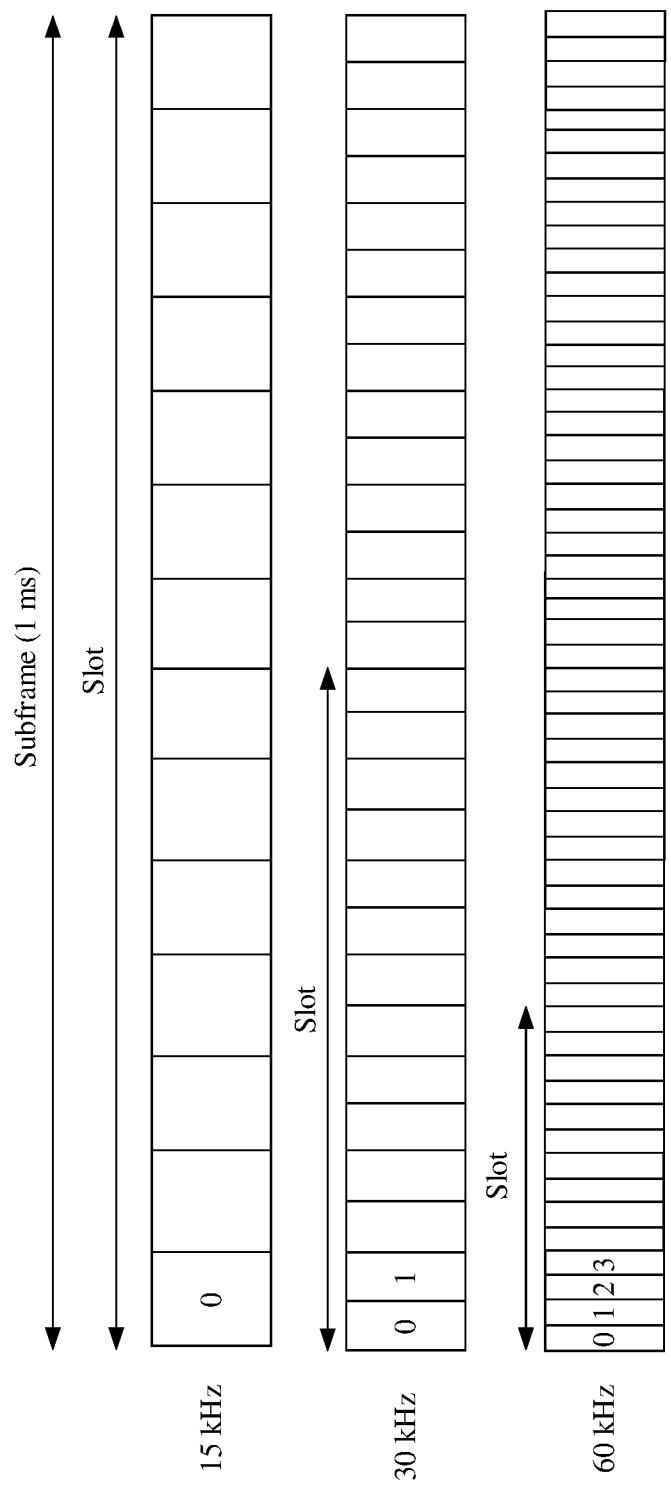
FIG. 2 is an example schematic diagram of a structure of a slot in cases of different subcarrier spacings.

In NR, time domain symbols of each subcarrier need to be aligned at a granularity of 0.5 ms. FIG. 2 is a schematic diagram of a structure of a slot in cases of different subcarrier spacings according to an embodiment of this application. As shown in FIG. 2, for a subcarrier spacing of 15 kHz, duration of 0.5 ms includes seven symbols; for a subcarrier spacing of 30 kHz, duration of 0.5 ms includes 14 symbols; and for a subcarrier spacing of 60 kHz, duration of 0.5 ms includes 28 symbols. Because all subcarrier spacings are selected as multiples or fractions of 15 kHz, there is a correspondence between symbol sequence numbers of different SCSs under the foregoing alignment constraint. For example, a location of the first symbol (symbol 0) of 15 kHz corresponds to the first symbol and the second symbol (symbols 0 and 1) of 30 kHz, or the first symbol to the fourth symbol (symbols 0, 1, 2, 3) of 60 kHz. FIG. 2 shows a slot formed by 14 symbols in a case of each type of SCS.

It can be learned from FIG. 2 that for subcarrier spacings of 15 kHz, 30 kHz, and 60 kHz, absolute time lengths of one slot are 1, 0.5, and 0.25 milliseconds (ms) respectively.

The numerology may include a value associated with a subcarrier characteristic, for example, may be a parameter u. Table 1 is a table of correspondences between different parameters u and different subcarrier spacings. In addition, Table 1 further shows absolute time lengths of one slot corresponding to different subcarrier spacings.

TABLE 1

| Numerology (µ) | Subcarrier spacing (kHz) | Slot length (ms) |
| --- | --- | --- |
| 0 | 15 | 1 |
| 1 | 30 | 0.5 |
| 2 | 60 | 0.25 |
| 3 | 120 | 0.125 |
| 4 | 240 | 0.0625 |
| 5 | 480 | 0.03125 |

Based on a specific requirement, the terminal device may perform data transmission in any one of the plurality of configured BWPs. For example, the network device may configure a large-bandwidth BWP (for example, a BWP 1) for the terminal device if a service volume of the terminal device is large at a first moment, and the network device may configure a small-bandwidth BWP (for example, a BWP 2) for the terminal device if a service volume of the terminal device is small at a second moment. The terminal device may switch between the plurality of BWPs, for example, switch from the BWP 1 to the BWP 2.

The BWP 1 and the BWP 2 may be uplink BWPs, or may be downlink BWPs. It should be noted that, for a TDD system or an unpaired spectrum system, an uplink BWP and a downlink BWP that have a same BWP identifier are bound to each other. When an uplink (or downlink) BWP is switched, a corresponding downlink (or uplink) BWP also needs to be switched.

Currently, that the network device and the terminal device implement BWP switching may include the following three methods.

Method 1: Downlink control information (DCI) is used to dynamically control the terminal device to switch between different BWPs. Details may be as follows:
- (1.1) DCI for scheduling downlink transmission is used to control the terminal device to perform downlink BWP switching. For example, the DCI for scheduling downlink transmission may include a BWP ID. In this way, the terminal device may be indicated to activate a downlink BWP corresponding to the BWP ID and receive, in the downlink BWP, a physical downlink shared channel (PDSCH) scheduled by the DCI.
- (1.2) DCI for scheduling uplink transmission is used to control the terminal device to perform uplink BWP switching. For example, the DCI for scheduling uplink transmission may include a BWP ID. In this way, the terminal device may be indicated to activate an uplink BWP corresponding to the BWP ID and transmit, in the uplink BWP, a physical uplink shared channel (PUSCH) scheduled by the DCI.

Method 2: Timer-based method is used. The network configures a BWP inactivity timer bwp-Inactivity Timer. If the bwp-Inactivity Timer of the terminal device expires in a current BWP, the terminal device may switch to a default BWP.

Method 3: RRC signaling is used for indication. The network device indicates, by sending RRC signaling, the terminal device to perform BWP switching.

BWP switching may also be understood as BWP activation and deactivation. For example, it is assumed that a downlink BWP currently activated by the terminal device is a BWP 1. When a BWP ID included in DCI for scheduling downlink transmission that is received by the terminal device indicates a BWP 2, that the terminal device performs BWP switching means that the terminal device needs to deactivate the downlink BWP 1 and activate the downlink BWP 2. The BWP used by the terminal device can be quickly adjusted in a dynamic activation/deactivation manner.

BWP switching requires a specific amount of time, and the BWP switching time includes an amount of PDCCH demodulation and DCI decoding time, an amount of baseband processing (for example, parameter calculation) time, an amount of radio frequency transition time, and the like. The network device needs to reserve a specific amount of processing time for the terminal device to complete BWP switching. The processing time reserved for the terminal device may be referred to as a BWP switching delay ($T_{BWPswitchDelay}$).

Figure 3:
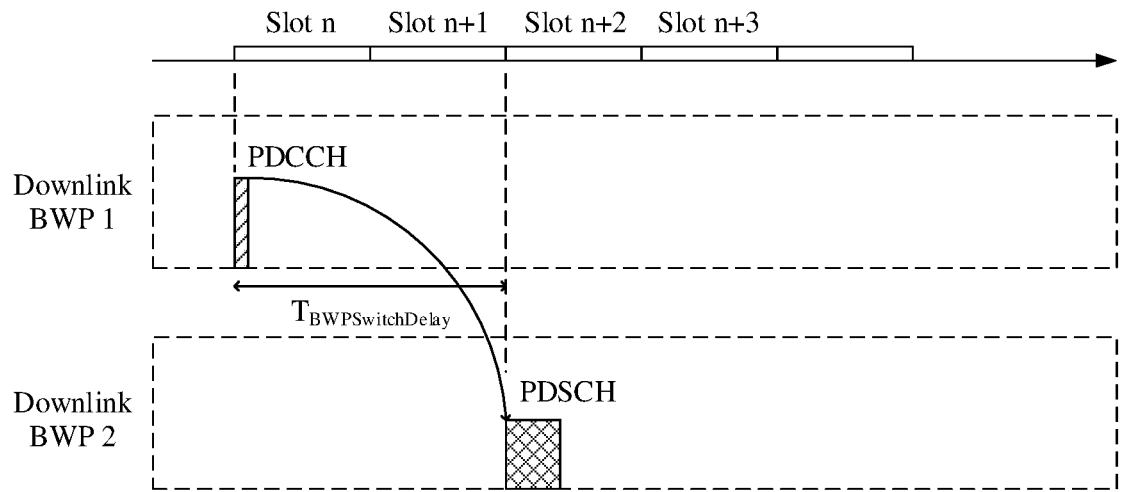
FIG. 3 is an example schematic diagram of indicating, by using DCI, a terminal device to switch a BWP.

FIG. 3 is a schematic diagram of indicating, by using DCI, a terminal device to switch a BWP. As shown in FIG. 3, for BWP switching indicated by DCI, if a slot in which the DCI indicating BWP switching is located is n, the terminal device needs to be able to receive a PDSCH (for downlink BWP switching) or send a PUSCH (for uplink BWP switching) in a new BWP after a start moment of a slot $n+T_{BWPswitchDelay}$.

For timer-based BWP switching, n is used to represent a sequence number of the first slot of the first downlink subframe (FR1) or downlink half-subframe (FR2) after the bwp-Inactivity Timer expires. Similarly, the terminal device needs to be able to receive a PDSCH (for downlink BWP switching) or send a PUSCH (for uplink BWP switching) in a new BWP after a start moment of a slot $n+T_{BWPswitchDelay}$.

Within a BWP switching delay (that is, a time period of $T_{BWPswitchDelay}$), the terminal device is not required to send an uplink signal or receive a downlink signal.

For example, as shown in FIG. 3, a currently active BWP is a BWP 1, DCI transmitted on a PDCCH indicates BWP switching from the BWP 1 to a BWP 2, and the DCI schedules a PDSCH at the same time. In FIG. 3, the BWP switching delay $T_{BWPswitchDelay}$ is equal to two slots. For the terminal device, the terminal device needs to ensure that BWP switching is completed within the BWP switching delay, and can receive downlink data PDSCH in the BWP 2 after a start moment of a slot n+2. For the network device, the network device needs to schedule data after the start moment of the slot $n+T_{BWPswitchDelay}$. This is because the terminal device does not receive data within the BWP switching delay.

Table 2 is a BWP switching delay table. According to different capabilities of the terminal device, the NR system currently defines two different BWP switching delay capability types, which are a type 1 and a type 2, as shown in Table 2. A specific BWP switching delay capability type to be used is determined based on capability reporting of the terminal device. The terminal device reports a capability parameter bwp-SwitchingDelay to the network device, where the capability parameter can indicate whether a BWP switching delay capability type of the terminal device is the type 1 or the type 2, that is, can indicate whether the type 1 or the type 2 is specifically used to determine the switching delay of the terminal device.

TABLE 2

| | | BWP switching delay $T_{BWPswitchDelay}$ (slot) | |
|---|---|---|---|
| μ | Slot length (ms) | Type 1 | Type 2 |
| 0 | 1 | 1 | 3 |
| 1 | 0.5 | 2 | 5 |
| 2 | 0.25 | 3 | 9 |
| 3 | 0.125 | 6 | 17 |

In Table 2, the parameter u is associated with the subcarrier spacing. Values of u are 0, 1, 2, and 3 respectively corresponding to carriers whose subcarrier spacings are 15 kHz, 30 kHz, 60 kHz, and 120 kHz.

In addition, if the subcarrier spacings of the two BWPs before and after the switching are different, the BWP switching delay needs to be determined based on a larger value of the subcarrier spacings of the BWPs before and after the switching.

For example, a BWP used by the terminal device is switched from the BWP 1 to the BWP 2. If subcarrier spacings of the BWP 1 and the BWP 2 are the same and are both 30 kHz, and a capability parameter reported by the terminal device indicates the type 1, the network device can determine that the switching delay of the terminal device needs to be two slots at 30 kHz, that is, a length of the switching delay is 0.5*2=1 millisecond.

For another example, a BWP used by the terminal device is switched from the BWP 1 to the BWP 2. If subcarrier spacings of the BWP 1 and the BWP 2 are different, the subcarrier spacing of the BWP 1 is 30 kHz, the subcarrier spacing of the BWP 2 is 60 kHz, and a capability parameter reported by the terminal device indicates the type 1, the network device can determine that the switching delay of the terminal device needs to be three slots at 60 kHz, that is, a length of the switching delay is 0.25*3=0.75 ms.

However, based on Table 2, a method in which the network device determines the switching delay of the terminal device based on the switching delay type of the terminal device and the subcarrier spacing of the BWP is not flexible or accurate.

BWP switching delays corresponding to different values of μ in Table 2 are generally determined according to a worst-case BWP switching delay. Even if BWP switching between two BWPs can be completed with a shorter delay, the network device cannot schedule the terminal device faster. This increases a data service delay and decreases a throughput.

Specifically, once the BWP switching delay capability type (for example, the type 1 or the type 2) of the terminal device is determined, the network device determines switching delays of the terminal device between all BWPs in a serving cell based on the capability type. The BWP switching may include a plurality of different scenarios. For example, in a scenario 1, the BWP switching requires a change of a center frequency and/or a bandwidth size of a BWP; in a scenario 2, the BWP switching requires only a change of a subcarrier spacing, and a center frequency and a bandwidth of a BWP remain unchanged; and in a scenario 3, the BWP switching requires only a change of a baseband parameter, and a BWP center frequency, a bandwidth, and an SCS remain unchanged.

The BWP switching in the scenario 1 requires an amount of radio frequency (RF) transition time, while the BWP switching in the scenario 2 and the scenario 3 requires little or no RF transition time. It is clear that, for the scenario 2 and the scenario 3, a BWP switching delay can be reduced, and the terminal device can complete BWP switching within a shorter time period. In addition, the baseband processing time and the RF transition time are closely related to implementation of the terminal device. Therefore, for switching between two BWPs whose center frequencies have a specific interval but the interval is small or whose bandwidth sizes change small, a terminal device with a stronger implementation capability can also complete BWP switching within a shorter time period.

In conclusion, the network device may determine, by using the BWP switching delay capability type reported by the terminal device, a switching delay between any two BWPs in all BWPs in a serving cell of the terminal device. The BWP switching delay capability type is reported for all BWPs in all cells. Therefore, the network device does not flexibly determine the BWP switching delay. The switching delay determined by the network device based on the BWP switching delay capability type reported by the terminal device may be inaccurate. Even if the terminal device can complete BWP switching within a shorter time period, the network device cannot schedule the terminal device faster. This increases a data service delay and decreases a throughput.

Currently, to more flexibly determine the BWP switching delay, in an implementation, a specific condition may be preset, and BWP switching that meets the condition may follow a preset shorter BWP switching delay.

Specifically, if switching between two BWPs requires only a change of a baseband parameter, but does not require a change of a BWP bandwidth, a frequency, or an SCS, or switching between the two BWPs requires only a change of a bandwidth, the BWP switching does not require an amount of RF transition time or requires little RF transition time.

In this way, for the BWP switching that meets such a condition, a protocol may define a new shorter BWP switching delay, and then, in a manner of network configuration or indication, the BWP switching that meets the condition follows the shorter BWP switching delay.

However, a preset condition cannot cover all BWP switching that can implement the shorter switching delay. Because a BWP switching delay largely depends on a capability of the terminal device, for BWP switching in different scenarios, terminal devices with different capabilities have different switching time periods. For example, for switching between two BWPs whose center frequencies have a specific interval but the interval is small or whose bandwidth sizes change small, a terminal device with a stronger implementation capability can also complete BWP switching within a shorter time period.

In addition, even if parameter configurations of two BWPs are the same, no switching delay is required between the two BWPs, but the terminal device may still expect to reserve a specific time period for switching between the two BWPs. For example, the terminal device expects to complete switching of a maximum quantity of multiple-input multiple-output layers (e.g., maximum number of MIMO layers) during switching between two BWPs. The switching of the maximum quantity of MIMO layers requires a specific time period while involving switching between RF radio frequency link and enabling and disabling of an antenna.

2. Downlink Maximum Quantity of MIMO Layers

A MIMO layer may also be referred to as a transport layer, a spatial layer, a layer, a transport stream, a spatial stream, a stream, or the like. The terminal device may determine a rank of a channel matrix based on a channel obtained through channel estimation. The network device may determine, with reference to the rank of the channel matrix fed back by the terminal device, a maximum quantity of MIMO layers that can be used for communication between the network device and the terminal device. Generally, a maximum quantity of MIMO layers that can be used when the network device communicates with the terminal device may be determined by a quantity of transmit antennas configured by the network device and a quantity of receive antennas configured by the terminal device. For example, the maximum quantity of MIMO layers may be less than or equal to a smaller value of the quantity of transmit antennas configured by the network device and the quantity of receive antennas configured by the terminal device.

Currently, an NR system protocol supports reporting, by the terminal device, a maximum quantity of MIMO layers that can be supported. A granularity of the reporting is a carrier level, that is, a maximum quantity of MIMO layers supported by the terminal device is applicable to one component carrier (CC). If there are a plurality of BWPs on the CC, all of the BWPs support a same maximum quantity of MIMO layers.

The terminal device reports a maximum quantity of uplink MIMO layers supporting an uplink CC and a maximum quantity of downlink MIMO layers supporting a downlink CC. For example, an information element FeatureSetDownlinkPerCC includes a maximum quantity of MIMO layers, that is, MIMO-LayersDL, that can be supported by a PDSCH transmitted on a downlink CC. An information element FeatureSetUplinkPerCC includes a maximum quantity of MIMO layers, that is, MIMO-LayerUL, that can be supported by a PUSCH transmitted on an uplink CC. The maximum quantity of MIMO layers supported by the PUSCH is classified into two cases: codebook transmission and non-codebook transmission.

After the terminal device reports the capability, the network configures, in RRC signaling, a maximum quantity of MIMO layers in a serving cell, and separately configures a maximum quantity of MIMO layers for a downlink PDSCH and an uplink PUSCH. The maximum quantity of MIMO layers configured in the RRC signaling applies to all BWPs in the serving cell.

As described above, the supported maximum quantity of MIMO layers reported by the terminal device is at a cell level, and the maximum quantity of MIMO layers configured by the network by using the RRC signaling is also at a cell level. Once the maximum quantity of MIMO layers is configured on the network, data is transmitted and received in all BWPs in a serving cell based on the maximum quantity of MIMO layers.

In some BWPs (where for example, a data rate is low for a small-bandwidth BWP), data may not need to be sent and received based on the maximum quantity of MIMO layers, and the terminal device may send and receive data in these BWPs through a small quantity of antennas, to reduce power consumption of the terminal device.

However, in an existing mechanism, the terminal device cannot disable some antennas to support the configured maximum quantity of MIMO layers. Consequently, the terminal device is not energy saving, because the network may schedule a PDSCH or a PUSCH for the terminal device by using the maximum quantity of MIMO layers. Therefore, the terminal device needs to estimate a downlink channel state information-reference signal (CSI-RS) by using the maximum quantity of MIMO layers, to feed back channel estimation to the base station, so that the base station sends the PDSCH based on channel information fed back by the terminal device. Alternatively, the terminal device needs to send an uplink sounding reference signal (SRS) by using the maximum quantity of MIMO layers, so that the terminal device can send the PUSCH by using the maximum quantity of MIMO layers.

It should be understood that the foregoing related descriptions of the BWP, the maximum quantity of MIMO layers, and the like are merely for ease of understanding the technical solutions of this application, and do not constitute any limitation on this application.

The embodiments of this application provide a communication method. A terminal device can indicate to a network device a specific switching delay between two BWPs in a serving cell, and the network device may determine the BWP switching delay based on the indication, so that a BWP switching delay determining method is more flexible and a result is more accurate. In this way, the terminal device and the network device can perform data transmission more efficiently.

The following describes the communication method provided in the embodiments of this application with reference to the accompanying drawings. In the embodiments, the network device may be the network device 11 in FIG. 1, and the terminal device may be the terminal device 12 in FIG. 1.

Figure 4:
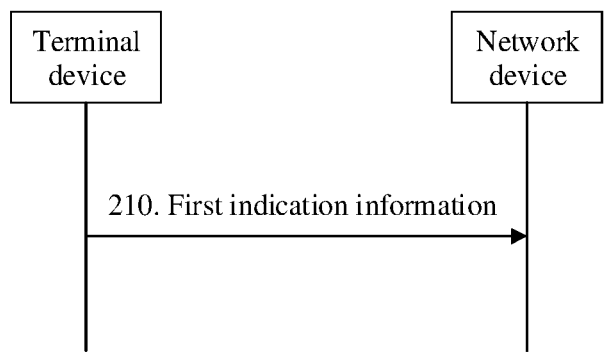
FIG. 4 is an example schematic flowchart of an example of a communication method according to this application.

FIG. 4 is a schematic flowchart of a communication method 200 according to this application. The following describes the communication method 200 provided in the embodiments of this application with reference to FIG. 4. The method 200 includes the following steps.

Step 210. A terminal device sends first indication information to a network device, where the first indication information indicates that a switching delay between a first bandwidth part BWP and a second BWP is first duration, where the first BWP and the second BWP are uplink BWPs or downlink BWPs used by the terminal device to send and receive data.

Correspondingly, in step 210, the network device receives the first indication information sent by the terminal device.

Specifically, the terminal device and the network device in this embodiment of this application may be communication devices in a TDD system, an FDD system, or any other system. This is not limited in this application.

Further, the network device may configure a plurality of downlink BWPs and a plurality of uplink BWPs (for example, four downlink BWPs and four uplink BWPs) for the terminal device in a first serving cell, to meet different use requirements of the terminal device.

Optionally, the plurality of BWPs may include an initial BWP, and the initial BWP is an initial BWP configured in a system message or an initial BWP configured in an RRC message.

Optionally, the plurality of BWPs may include a default BWP, so that the terminal device switches from a current active BWP to the default BWP, to save power.

Optionally, the terminal device may be in a carrier aggregation scenario, the terminal device may have a plurality of serving cells, and the first serving cell may be one of the plurality of serving cells.

Optionally, the network device may configure a plurality of uplink BWPs and a plurality of downlink BWPs for the terminal device in other serving cells different from the first serving cell.

In this embodiment of this application, the first BWP and the second BWP are uplink BWPs or downlink BWPs used by the terminal device to send and receive data. The uplink BWPs or the downlink BWPs used to send and receive data may be BWPs that have been configured by the network device for the terminal device. Alternatively, the uplink BWPs or the downlink BWPs used to send and receive data may be BWPs that are about to be configured by the network device for the terminal device but have not been completely configured. For example, the uplink BWPs or the downlink BWPs used to send and receive data may be BWPs that the terminal device recommends the network device to newly configure for the terminal device.

Optionally, the first BWP and the second BWP may be any two of the plurality of downlink BWPs configured by the network device for the terminal device in the first serving cell.

Optionally, the first BWP and the second BWP may be any two of the plurality of uplink BWPs configured by the network device for the terminal device in the first serving cell.

For example, the first BWP and the second BWP may be two of the plurality of downlink BWPs.

For another example, the first BWP and the second BWP may be two of the plurality of uplink BWPs.

For another example, the first BWP or the second BWP may be the initial BWP.

For another example, the first BWP or the second BWP may be the default BWP.

Optionally, at least one BWP in the first BWP and the second BWP may alternatively be a BWP that the terminal device recommends the network device to configure for the terminal device in the first serving cell.

It should be understood that, in this application, the BWP that the terminal device recommends the network device to configure for the terminal device includes a BWP that is about to be configured but has not been completely configured.

Optionally, when the terminal device sends the first indication information to the network device, at least one BWP in the first BWP and the second BWP may be a BWP that is about to be configured but has not been completely configured.

For example, the first BWP (or the second BWP) may be a BWP that the terminal device recommends the network device to configure (the network device is about to configure but has not completely configured) for the terminal device in the first serving cell. The second BWP (or the first BWP) may be a BWP that has been completely configured by the network device for the first serving cell.

For another example, both the first BWP and the second BWP may be BWPs that the terminal device recommends the network device to configure for the terminal device in the first serving cell. In this case, both the first BWP and the second BWP may be BWPs that are about to be configured but have not been completely configured.

In this embodiment of this application, the first indication information indicates that the switching delay between the first BWP and the second BWP is the first duration. That is, the first duration is the switching delay between the first BWP and the second BWP. After receiving the first indication information, the network device may determine, based on the first indication information, that the switching delay between the first BWP and the second BWP is the first duration.

It should be understood that the first duration is the switching delay between the first BWP and the second BWP, and the switching delay between the first BWP and the second BWP includes a switching delay for switching from the first BWP to the second BWP; or a switching delay for switching from the second BWP to the first BWP.

Further, when switching is performed between the first BWP and the second BWP, for example, a BWP used by the terminal device is switched from the first BWP to the second BWP or is switched from the second BWP to the first BWP, the first duration may be used as the switching delay. The terminal device and the network device perform BWP switching based on the first duration, and perform data transmission based on the first duration.

For example, the first duration may be T slots (where T is an integer greater than or equal to 0). If the network device indicates the terminal device to switch from the first BWP to the second BWP, it indicates that a slot in which DCI indicating the BWP switching is located is n. In this case, the terminal device completes the switching in the T slots, and may receive a PDSCH (when the first BWP and the second BWP are downlink BWPs) or send a PUSCH (when the first BWP and the second BWP are uplink BWPs) in a new BWP (that is, the second BWP) after a start moment of a slot n+T. The network device may schedule the PDSCH or the PUSCH in the second BWP after the start moment of the slot n+T.

For another example, the first duration may be T slots (where T is an integer greater than or equal to 0). For timer-based BWP switching, n is used to represent a sequence number of the first slot of the first downlink subframe or downlink half-subframe after a timer (for example, bwp-Inactivity Timer) expires. Likewise, the terminal device may receive a PDSCH or send a PUSCH in a new BWP (that is, the second BWP) after a start moment of a slot n+T, and the network device may schedule the PDSCH or the PUSCH after the start moment of the slot n+T.

In conclusion, in this embodiment of this application, the terminal device sends the first indication information to the network device. The first indication information indicates that the switching delay of the terminal device between the first BWP and the second BWP is the first duration. After receiving the first indication information, the network device can determine that the switching delay between the first BWP and the second BWP is the first duration.

Compared with a case in which the terminal device reports a BWP switching delay capability type of the terminal device and the network device determines a switching delay between any two BWPs in a serving cell, in this embodiment of this application, the terminal device can indicate to the network device a switching delay between two BWPs in a plurality of BWPs (including a configured BWP and a BWP that is about to be configured) in a serving cell, and the network device can determine the BWP switching delay based on the indication. Therefore, a BWP switching delay determining (e.g., indicating) method is more flexible, and a result is more accurate. When the terminal device performs switching between the two BWPs, switching may be performed based on the reported switching delay, so that the terminal device and the network device can perform data transmission more efficiently.

Figure 5:
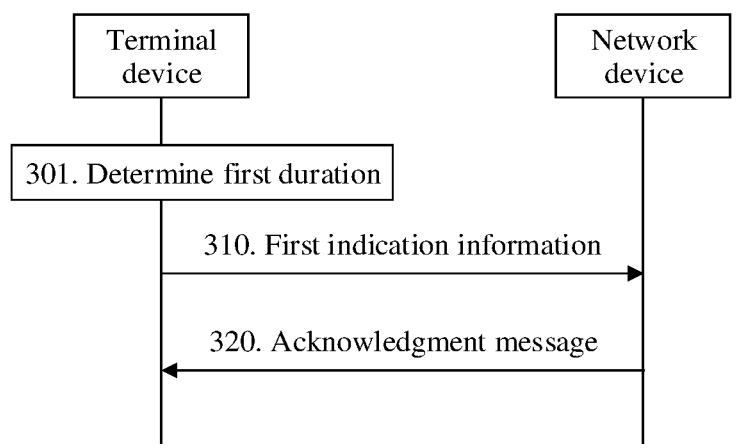
FIG. 5 is an example schematic flowchart of another example of a communication method according to this application.

FIG. 5 is a schematic flowchart of a communication method 300 according to this application. The embodiment shown in FIG. 5 may be considered as a further description of the embodiment (that is, the method 200) shown in FIG. 4. The following describes the communication method 300 provided in the embodiments of this application with reference to FIG. 5. The method 300 includes the following steps.

Step 310. A terminal device sends first indication information to a network device, where the first indication information indicates that a switching delay between a first bandwidth part BWP and a second BWP is first duration, where the first BWP and the second BWP are any two of a plurality of downlink BWPs or a plurality of uplink BWPs configured by the network device for the terminal device in a first serving cell.

Correspondingly, in step 310, the network device receives the first indication information sent by the terminal device.

For step 310, refer to step 210 in the method 200. A difference is described herein.

In this embodiment of this application, the first BWP and the second BWP are any two of the plurality of downlink BWPs or the plurality of uplink BWPs configured by the network device for the terminal device in the first serving cell. In other words, the first BWP and the second BWP may be BWPs that have been configured by the network device for the terminal device in the first serving cell.

For example, the first BWP and the second BWP may be two of a plurality of configured downlink BWPs.

For another example, the first BWP and the second BWP may be two of a plurality of configured uplink BWPs.

For another example, the first BWP or the second BWP may be an initial BWP that has been configured.

For another example, the first BWP or the second BWP may be a default BWP that has been configured.

In this embodiment of this application, the first indication information indicates that the switching delay between the first BWP and the second BWP is the first duration. That is, the first duration is the switching delay between the first BWP and the second BWP. After receiving the first indication information, the network device may determine, based on the first indication information, that the switching delay between the first BWP and the second BWP is the first duration.

Compared with a case in which the terminal device reports a BWP switching delay capability type of the terminal device and the network device determines a switching delay between any two BWPs in a serving cell, in this embodiment of this application, the terminal device can indicate to the network device a switching delay between two configured BWPs in a serving cell, and the network device can determine the BWP switching delay based on the indication. Therefore, a BWP switching delay determining (e.g., indicating) method is more flexible, and a result is more accurate. When the terminal device performs switching between the two BWPs, switching may be performed based on the reported switching delay, so that the terminal device and the network device can perform data transmission more efficiently.

Optionally, refer to FIG. 5. Before step 310, that is, before the terminal device sends the first indication information to the network device, the method 300 further includes the following step. Step 301. The terminal device determines the first duration.

Specifically, the first duration is the switching delay between the first BWP and the second BWP. When switching is performed between the first BWP and the second BWP, for example, a BWP used by the terminal device is switched from the first BWP to the second BWP or is switched from the second BWP to the first BWP, the terminal device may determine the first duration, and use the first duration as the switching delay. The terminal device and the network device perform BWP switching based on the first duration, and perform data transmission based on the first duration.

In this embodiment of this application, the terminal device may determine a specific time length of the switching delay between the first BWP and the second BWP. For example, the first duration may be an absolute time length. For example, the first duration may be 100, 200, 300, or 400 microseconds (μs), 0.5, 0.75, 1.0, or 1.25 milliseconds, or the like.

For another example, the first duration may alternatively be several slots. For example, the first duration may be 1, 2, 3, or 4 slots.

When subcarrier spacings of the first BWP and the second BWP are different, an absolute time length corresponding to one slot of the first BWP and an absolute time length corresponding to one slot of the second BWP are different. In this case, the first duration may be several slots of the first BWP, the first duration may be several slots of the second BWP, or the first duration may be several slots corresponding to a BWP with a larger subcarrier spacing in the first BWP and the second BWP. This is not limited in this application.

Optionally, the first duration may be 0.

Optionally, the first duration is applicable only to the switching delay between the first BWP and the second BWP, and the first duration is not applicable to a switching delay between other BWPs in the first serving cell.

In this embodiment of this application, the first duration may be shorter than second duration, and the second duration is a switching delay that is between the first BWP and the second BWP and that is determined based on the BWP switching delay capability type of the terminal device.

For example, the first duration determined by the terminal device is one slot, the BWP switching delay capability type of the terminal device is a type 1, and subcarrier spacings of both the first BWP and the second BWP are 30 kHz (that is, a value of μ is 1). According to Table 2, it may be learned that the switching delay between the first BWP and the second BWP is two slots (that is, the second duration is two slots). In other words, in this case, the first duration may be shorter than the second duration.

It can be learned from the foregoing description that the switching delay determined by using the BWP switching delay capability type may be excessively long (where the terminal device may not need that long time to perform BWP switching). In this application, the first duration is shorter than the second duration, and the terminal device can complete BWP switching faster, so that the terminal device and the network device can implement data transmission faster, thereby reducing a data service delay and improving a data throughput.

In this embodiment of this application, the switching delay (that is, the first duration) between the first BWP and the second BWP is determined by the terminal device instead of the network device. A method for determining the switching delay between the first BWP and the second BWP by the terminal device is not limited in this application. For example, the terminal device may determine the first duration based on configuration parameters of the first BWP and the second BWP.

Specifically, the terminal device can determine, based on the configuration parameters of the first BWP and the second BWP, changes of the configuration parameters of the first BWP and the second BWP, and further determine change magnitudes. Further, the terminal device can determine a calculation amount and an amount of processing time that are required in switching between the first BWP and the second BWP, and then can determine the first duration based on calculation and processing capabilities of the terminal device.

Optionally, the configuration parameter may include at least one of a bandwidth, a center frequency, and a subcarrier spacing.

In this embodiment of this application, the configuration parameters of the first BWP and the second BWP may meet at least one of the following conditions:

a difference between center frequencies of the first BWP and the second BWP is less than or equal to a first threshold;

a difference between bandwidths of the first BWP and the second BWP is less than or equal to a second threshold; and a difference between subcarrier spacings of the first BWP and the second BWP is less than or equal to a third threshold.

It should be understood that the same or similar configuration parameters of the first BWP and the second BWP can help reduce a calculation amount and an amount of radio frequency transition time required in switching, that is, a small amount of time may be required for switching between the first BWP and the second BWP that meet the foregoing condition. In this case, if the switching delay determined by using the BWP switching delay capability type of the terminal device may be excessively large (e.g., greater than an amount of actual processing time required during switching), data transmission between the terminal device and the network device is adversely affected. In this case, the terminal device determines the switching delay (that is, determines the first duration) between the first BWP and the second BWP that meet the foregoing condition, and a result can be more accurate. This facilitates efficient data transmission between the terminal device and the network device.

Optionally, the first threshold, the second threshold, and the third threshold may be specified in a protocol or a system, may be agreed upon between the network device and the terminal device, or may be determined by the terminal device based on a capability of the terminal device. This is not limited in this application.

In a possible implementation, the first threshold, the second threshold, and the third threshold may be 0. In this case, the configuration parameters of the first BWP and the second BWP may meet at least one of the following conditions:

the center frequencies of the first BWP and the second BWP are the same;
the bandwidths of the first BWP and the second BWP are the same; and
the subcarrier spacings of the first BWP and the second BWP are the same.

Optionally, in step 310, the first indication information includes an identifier of the first BWP, an identifier of the second BWP, and indication information of the first duration.

Specifically, after determining the first duration, the terminal device may report the first duration to the network device, so that the network device may determine the switching delay between the first BWP and the second BWP based on the reported content (that is, based on the first indication information). In this embodiment of this application, the first indication information includes the identifiers of the first BWP and the second BWP. The identifier of the BWP may be a BWP identifier. For example, if the identifiers of the first BWP and the second BWP are BWP ID 1 and BWP ID 2 respectively, the first indication information may include BWP ID 1 and BWP ID 2.

It should be understood that in this embodiment of this application, the identifiers of the first BWP and the second BWP may alternatively exist in another form, in addition to the foregoing BWP IDs. This is not limited in this application. Specifically, for the first BWP or the second BWP, any information that can be used to identify the first BWP or the second BWP may be considered as the identifier of the first BWP or the second BWP.

That is, the identifier of the first BWP or the second BWP may alternatively be other information of the first BWP or the second BWP. For example, information that can distinguish the first BWP from another BWP may be used as the identifier of the first BWP, and information that can distinguish the second BWP from another BWP may be used as the identifier of the second BWP.

For example, the identifier of the first BWP or the second BWP may be a configuration parameter of the BWP, for example, may be at least one piece of information such as a subcarrier spacing (or a value of μ), a center frequency, or a bandwidth.

For example, if values of μ of a plurality of BWPs other than the first BWP in a current first serving cell are 1, and a value of μ of the first BWP is 2, the value 2 of μ may be used as the identifier of the first BWP.

In addition, the first indication information in this embodiment of this application further includes the indication information of the first duration. The indication information of the first duration may indicate the first duration. The indication information of the first duration may exist in a plurality of forms. This is not limited in this application.

Optionally, the indication information of the first duration may include a value of the first duration.

For example, the indication information of the first duration may include a field including M bits, where M may be an integer greater than or equal to 1, and the value of the first duration may be a decimal value represented by the M-bit field. For example, when M is equal to 2, it may indicate that the first duration is {0, 1, 2, 3} slots. In other words, fields 00, 01, 10, and 11 may respectively indicate that the value of the first duration is 0, 1, 2, and 3 slots.

Optionally, the indication information of the first duration may include an index value of the first duration. The network device may determine the first duration by indexing the index value to a value in a predefined table. Values in the predefined table may be slots or absolute time. Optionally, the index value of the first duration may alternatively be a field including M bits, where M may be an integer greater than or equal to 1.

Table 3 is a table of a correspondence between the index value of the first duration and the value of the first duration, where the first duration corresponding to the index value of the first duration in Table 3 is in a unit of slot. For example, the index value of the first duration may be "01." The network device can determine, based on the index value and with reference to Table 3, that the first duration is two slots.

TABLE 3

| Index value of the first duration | First duration (unit: slot) |
|---|---|
| 00 | 1 |
| 01 | 2 |
| 10 | 3 |
| 11 | 4 |

When the subcarrier spacings of the first BWP and the second BWP are different, a protocol may define a subcarrier spacing to which the first duration that is in a unit of slot and that is indicated by the M bits corresponds. Optionally, the first duration may be a larger value or a smaller value of the subcarrier spacings corresponding to the first BWP and the second BWP, or may be a predefined reference subcarrier spacing value.

Table 4 is a table of a correspondence between the index value of the first duration and the value of the first duration, where the first duration corresponding to the index value of the first duration in Table 4 is in a unit of microsecond. For example, the index value of the first duration may be "10." The network device can determine, based on the index value and with reference to Table 4, that the first duration is 300 microseconds.

TABLE 4

| Index value of the first duration | First duration (unit: microsecond) |
|---|---|
| 00 | 100 |
| 01 | 200 |
| 10 | 300 |
| 11 | 400 |

In a possible implementation, the index value of the first duration may further indirectly indicate the value of the first duration. Similar to the foregoing Table 2, a system or a protocol may specify a new BWP switching delay capability type 3. For example, a switching delay of the type 3 is not greater than a corresponding switching delay of the type 1 or the type 2. The index value of the first duration may include the type 3, and the network device may indirectly determine the value of the first duration based on the type 3. Table 5 shows a table including a BWP switching delay of a type 3 according to this application.

TABLE 5

| μ | Slot length (ms) | BWP switching delay $T_{BWPswitchDelay}$ (slot) Type 3 |
|---|---|---|
| 0 | 1 | 1 |
| 1 | 0.5 | 1 |
| 2 | 0.25 | 2 |
| 3 | 0.125 | 3 |

In a specific example, the indication information of the first duration includes the index value of the first duration, and the index value is the type 3. After receiving the indication information, the network device may indirectly determine the switching delay (that is, the value of the first duration) between the first BWP and the second BWP based on the index value (that is, the type 3). For example, if the terminal device first determines that the subcarrier spacings of the first BWP and the second BWP are both 30 kHz (that is, the value of μ is 1), the terminal device can determine, according to Table 5, that the first duration is one slot corresponding to the subcarrier spacing of 30 KHz.

For another example, if the subcarrier spacings of the first BWP and the second BWP are 30 KHz and 60 kHz respectively (that is, the subcarrier spacings of the first BWP and the second BWP are different), the network device may determine the value of the first duration based on a switching delay of the type 3 corresponding to a BWP with a larger subcarrier spacing. For example, it may be determined, according to Table 5, that the value of the first duration in this case is two slots corresponding to the subcarrier spacing of 60 KHz.

Optionally, the first serving cell is any one of a plurality of serving cells of the terminal device, the first indication information further includes an identifier of the first serving cell, and the identifier may be a cell identifier (cell ID).

It is easy to understand that, based on the foregoing related descriptions, the terminal device may have a plurality of serving cells (where the first serving cell may be one of the plurality of serving cells), and each serving cell may include a plurality of BWPs. In this case, if only an identifier of a BWP is reported to the network device, the network device may not know a specific serving cell to which the BWP belongs. Therefore, the first indication information may further include the identifier of the first serving cell. This can help the network device determine a specific serving cell to which the first BWP and the second BWP belong.

In this embodiment of this application, the first indication information may be carried in an RRC message or another message. This is not limited in this application. For example, when the first indication information is carried in an RRC message, the RRC message may include but is not limited to either of the following messages: UE assistance information (UEAssistanceInformation) and UE capability information (UECapability Information).

It should be understood that a BWP in which the first indication information is sent is not limited in this embodiment of this application.

Optionally, the first indication information may be sent by using any one of a plurality of uplink BWPs in the first serving cell.

Optionally, the first BWP and the second BWP may be uplink BWPs, and the first indication information may be sent in the first BWP or the second BWP.

Optionally, the terminal device may be in a carrier aggregation scenario, that is, the terminal device may have a plurality of serving cells, and the first indication information may be sent by using any serving cell other than the first serving cell in the plurality of serving cells.

For example, the first indication information may be sent by using any uplink BWP in a serving cell other than the first serving cell.

In this embodiment of this application, the first indication information includes the identifiers of the first BWP and the second BWP, and further includes the indication information of the first duration. After receiving the first indication information including the foregoing content, according to a system or a protocol specification, or an agreement between the network device and the terminal device, the network device can determine that the switching delay of the terminal device between the first BWP and the second BWP is the first duration.

It should be understood that in the embodiments of this application, the "protocol" may be a standard protocol in the communication field, for example, may include an LTE protocol, an NR protocol, and a related protocol applied to a future communication system. This is not limited in this application.

Further, after the network device determines that the switching delay of the terminal device between the first BWP and the second BWP is the first duration, the network device and the terminal device may perform data transmission based on the first duration.

Optionally, after receiving the first indication information and determining, based on the first indication information, that the switching delay of the terminal device between the first BWP and the second BWP is the first duration, the network device may feed back an acknowledgment message to the terminal device. The terminal device considers, only after receiving the acknowledgment message, that the switching delay between the first BWP and the second BWP takes effect as the first duration.

Optionally, refer to FIG. 5. The method 300 further includes the following step.

Step 320. The network device sends the acknowledgment message to the terminal device, where the acknowledgment message indicates that the switching delay of the terminal device between the first BWP and the second BWP is the first duration.

Correspondingly, in step 320, the terminal device receives the acknowledgment message sent by the network device.

Optionally, the acknowledgment message may be carried in any one of the following messages: an RRC message, a media access control control element message, or a layer 1 message.

Optionally, the RRC message may include but is not limited to any one of the following messages: an RRC setup (RRCSetup) message, an RRC reject (RRCReject) message, an RRC reconfiguration (RRCReconfiguration) message, an RRC reestablishment (RRCReestablishment) message, an RRC release (RRCRelease) message, and an RRC resume (RRCResume) message.

Optionally, the layer 1 message includes DCI.

In addition, in another implementation, after the terminal device sends the first indication information, the network device may implicitly notify the terminal device that the network device has received the first indication information, and that the network device determines that the switching delay of the terminal device between the first BWP and the second BWP takes effect as the first duration.

For example, the terminal device reports that the switching delay between the first BWP and the second BWP is the first duration T, and the terminal device also reports the BWP switching delay capability type of the terminal device, the BWP switching delay determined by using the BWP switching delay capability type of the terminal device is T1, that is, the second duration is T1, and T is less than T1. After receiving the first indication information, the network device does not need to additionally send the acknowledgment message to the terminal device, but directly indicates, in DCI indicating the terminal device to switch from the first BWP to the second BWP, that scheduled data (a PDSCH or a PUSCH) is located in a time domain location between a start moment of a slot n+T and a start moment of a slot n+T1. If the terminal device receives the DCI indicating BWP switching, the terminal device may consider that the network device has updated the switching delay between the first BWP and the second BWP from the second duration to the first duration based on the first indication information reported by the terminal device. Otherwise, if the network device still schedules, after the start moment of the slot n+T1, the data scheduled by the DCI indicating BWP switching, the terminal device cannot assume that the switching delay between the first BWP and the second BWP takes effect as the first duration.

In addition, in another implementation, it may be specified in a protocol that, after the terminal device successfully sends the first indication information and the network device successfully receives the first indication information, the terminal device and the network device determine that the switching delay between the first BWP and the second BWP takes effect as the first duration. In this manner, regardless of whether the network device schedules, after the start moment of the slot n+T1 or between the start moment of the slot n+T and the start moment of the slot n+T1, the data scheduled by the DCI indicating BWP switching, the terminal device considers that the switching delay between the first BWP and the second BWP has taken effect as the first duration.

In this embodiment of this application, in addition to determining the switching delay between the first BWP and the second BWP, the terminal device may further determine a switching delay between other BWPs (for example, between a third BWP and a fourth BWP), and then report the switching delay to the network device. This is not limited in this application.

Optionally, in step 301, the terminal device may further determine third duration, where the third duration is the switching delay between the third BWP and the fourth BWP. The third BWP and the fourth BWP are any two of the plurality of downlink BWPs or the plurality of uplink BWPs configured by the network device for the terminal device in the first serving cell.

Optionally, in step 310, the first indication information further includes an identifier of the third BWP, an identifier of the fourth BWP, and indication information of the third duration.

In other words, in addition to carrying the identifiers of the first BWP and the second BWP and the indication information of the first duration, the first indication information may further carry the identifiers of the third BWP and the fourth BWP and the indication information of the third duration. In this way, signaling overheads can be reduced.

It should be understood that in this case, in the first indication information, the identifiers of the first BWP and the second BWP need to be associated with the indication information of the first duration, and the identifiers of the third BWP and the fourth BWP need to be associated with the indication information of the third duration, to help the network device determine a specific correspondence.

Optionally, the third duration may be or may not be equal to the first duration.

Optionally, the third duration is equal to the first duration. In this case, the first indication information may carry the identifiers of the first BWP and the second BWP, identifiers of the third BWP and the fourth BWP, and indication information of one segment of duration, so that signaling overheads can be reduced. In this case, the first indication information further needs to include a corresponding association relationship, to help the network device determine two BWPs between which the indication information of the segment of duration is specifically applicable to switching.

Optionally, if the terminal device and the network device are in a TDD system, the third BWP may be a BWP bound to the first BWP, and the fourth BWP may be a BWP bound to the second BWP. An advantage of the foregoing configuration is that, for the TDD system, when the first BWP and the second BWP are used in switching, BWPs bound to the first BWP also need to be used in switching. In this case, switching delays of two pairs of uplink and downlink switching may be indicated simultaneously.

Optionally, one of the third BWP and the fourth BWP may be a same BWP as one of the first BWP and the second BWP.

For example, four downlink BWPs are configured for the terminal device in the first serving cell, and identifiers are separately BWP ID 0, BWP ID 1, BWP ID 2, and BWP ID 3. The first BWP and the second BWP respectively correspond to BWPs identified as BWP ID 0 and BWP ID 1, and the first duration is a switching delay between the BWPs identified as BWP ID 0 and BWP ID 1. The third BWP and the fourth BWP may respectively correspond to BWPs identified as BWP ID 1 and BWP ID 2, and the third duration is a switching delay between the BWPs identified as BWP ID 1 and BWP ID 2.

Optionally, the terminal device may determine switching delays only between some BWPs rather than all BWPs in the first serving cell.

Optionally, in the carrier aggregation scenario, the third BWP and the fourth BWP may alternatively be any two of a plurality of downlink BWPs or a plurality of uplink BWPs that are configured by the network device for the terminal device in a serving cell different from the first serving cell.

Optionally, in the carrier aggregation scenario, when the terminal device has a plurality of serving cells, the first indication information needs to further include an identifier of the first serving cell in which the first BWP and the second BWP are located, and an identifier of a serving cell in which the third BWP and the fourth BWP are located.

In this embodiment of this application, the terminal device may further continue to report the BWP switching delay capability type of the terminal device to the network device, so that the network device determines, based on the BWP switching delay capability type, a switching delay between other BWPs that are not indicated by the first indication information (that is, between other BWPs that are not determined by the terminal device).

Figure 6:
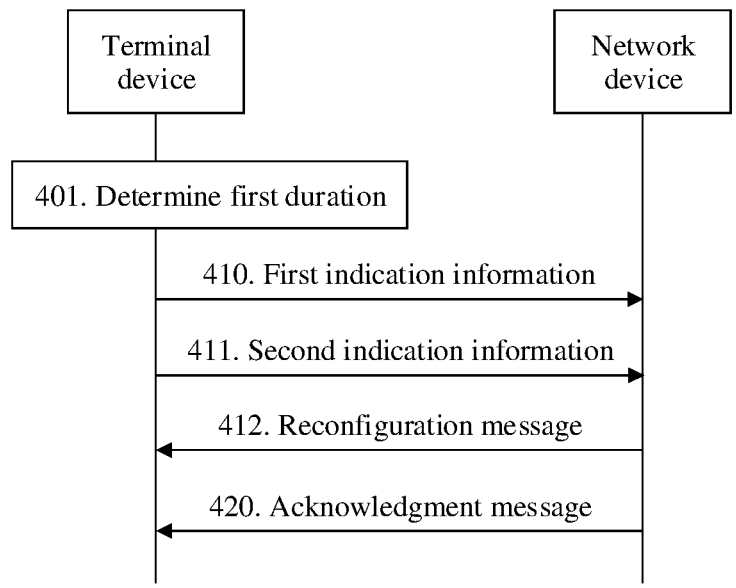
FIG. 6 is an example schematic flowchart of still another example of a communication method according to this application.

FIG. 6 is a schematic flowchart of a communication method 400 according to this application. The embodiment shown in FIG. 6 may be considered as a further description of the embodiment (that is, the method 200) shown in FIG. 4. The following describes the communication method 400 provided in the embodiments of this application with reference to FIG. 6. The method 400 includes the following steps.

Step 410. A terminal device sends first indication information to a network device, where the first indication information indicates that a switching delay between a first bandwidth part BWP and a second BWP is first duration, where at least one BWP in the first BWP and the second BWP is a BWP that the terminal device recommends the network device to configure for the terminal device in the first serving cell.

Correspondingly, in step 410, the network device receives the first indication information sent by the terminal device.

For step 410, refer to step 210 in the method 200 and step 310 in the method 300. A difference is described herein.

In this embodiment of this application, at least one BWP in the first BWP and the second BWP may alternatively be a BWP that the terminal device recommends the network device to configure for the terminal device in the first serving cell.

It should be understood that, in this application, the BWP that the terminal device recommends the network device to configure for the terminal device includes a BWP that is about to be configured but has not been completely configured.

Optionally, when the terminal device sends the first indication information to the network device, at least one BWP in the first BWP and the second BWP may be a BWP that is about to be configured but has not been completely configured.

For example, the first BWP (or the second BWP) may be a BWP that the terminal device recommends the network device to configure (the network device is about to configure but has not completely configured) for the terminal device in the first serving cell. The second BWP (or the first BWP) may be a BWP that has been completely configured by the network device for the first serving cell.

For another example, both the first BWP and the second BWP may be BWPs that the terminal device recommends the network device to configure for the terminal device in the first serving cell. In this case, both the first BWP and the second BWP may be BWPs that are about to be configured but have not been completely configured.

For another example, the first BWP and/or the second BWP may be uplink BWPs that the terminal device recommends the network device to configure for the terminal device in the first serving cell.

For another example, the first BWP and/or the second BWP may be downlink BWPs that the terminal device recommends the network device to configure for the terminal device in the first serving cell.

In this embodiment of this application, the first indication information indicates that the switching delay between the first BWP and the second BWP is the first duration. That is, the first duration is the switching delay between the first BWP and the second BWP. After receiving the first indication information, the network device may determine, based on the first indication information, that the switching delay between the first BWP and the second BWP is the first duration.

It should be understood that the first duration is the switching delay between the first BWP and the second BWP, and the switching delay between the first BWP and the second BWP includes a switching delay for switching from the first BWP to the second BWP; or a switching delay for switching from the second BWP to the first BWP.

In conclusion, in this embodiment of this application, the terminal device sends the first indication information to the network device, where the first indication information indicates that the switching delay of the terminal device between the first BWP and the second BWP is the first duration. At least one BWP in the first BWP and the second BWP may be a BWP that the terminal device recommends to the network device to newly configure for the terminal device in the first serving cell. After receiving the first indication information, the network device can determine that the switching delay between the first BWP and the second BWP is the first duration.

Compared with a case in which the terminal device reports a BWP switching delay capability type of the terminal device and the network device determines a switching delay between any two BWPs in a serving cell, in this embodiment of this application, the terminal device can indicate to the network device a switching delay between at least one BWP that the terminal device recommends to newly configure and another BWP in a serving cell, and the network device can determine the BWP switching delay based on the indication. Therefore, a BWP switching delay determining (indicating) method is more flexible, and a result is more accurate. When the terminal device performs switching between the two BWPs, switching may be performed based on the reported switching delay, so that the terminal device and the network device can perform data transmission more efficiently.

Optionally, refer to FIG. 6. Before step 410, that is, before the terminal device sends the first indication information to the network device, the method 400 further includes the following step. Step 401. The terminal device determines the first duration.

For step 401, refer to step 301 in the method 300. A difference is described herein.

Similarly, the terminal device may determine the first duration based on configuration parameters of the first BWP and the second BWP.

Different from the foregoing embodiment shown in FIG. 5, in this embodiment, the at least one BWP in the first BWP and the second BWP is a BWP that the terminal device recommends the network device to newly configure for the terminal device in the first serving cell. In other words, when step 401 is performed, that is, when the terminal device determines the first duration, the at least one BWP is a new BWP that the terminal device recommends the network device to configure but has not been configured.

Therefore, the terminal device determines the first duration based on the configuration parameters of the first BWP and the second BWP, where the configuration parameter of the at least one BWP (that is, the newly configured BWP) may be a configuration parameter recommended by the terminal device for the BWP.

Similarly, the recommended configuration parameter may include at least one of a bandwidth, a center frequency, and a subcarrier spacing.

Optionally, in step 410, the first indication information includes an identifier of the first BWP, an identifier of the second BWP, and indication information of the first duration.

Different from the foregoing embodiment shown in FIG. 5, in this embodiment, the at least one BWP in the first BWP and the second BWP is a BWP that the terminal device recommends the network device to newly configure for the terminal device in the first serving cell. In this case, because the at least one newly configured BWP has not been completely configured, a corresponding BWP identifier (BWP ID) has not been allocated.

Therefore, in this embodiment, an identifier of the at least one newly configured BWP (that is, the first BWP and/or the second BWP) may be other information of the first BWP or the second BWP. For example, information that can distinguish the first BWP from another BWP may be used as the identifier of the first BWP, and information that can distinguish the second BWP from another BWP may be used as the identifier of the second BWP.

For example, the identifier of the at least one newly configured BWP may be a configuration parameter of the BWP, for example, may be at least one piece of information such as a subcarrier spacing (or a value of µ), a center frequency, or a bandwidth.

In another implementation, the identifier of the at least one newly configured BWP may alternatively be an identifier of a BWP that the terminal device recommends being configured. For example, two downlink BWPs are currently configured for the terminal device, and are numbered 0 and 1, and the first BWP is a configured BWP with the identifier of 0. The terminal device recommends that the second BWP be newly configured, and an identifier of the second BWP is BWP identifier 2, indicating that the terminal device recommends the network device to configure a new downlink BWP with the identifier of 2.

If the first BWP and/or the second BWP are configured BWPs, for the identifiers of the first BWP and/or the second BWP, refer to the embodiment shown in the method 300 in FIG. 5.

For the indication information of the first duration, refer to the embodiment shown in the method 300 in FIG. 5.

Optionally, refer to FIG. 6. The method 400 further includes the following step.

Step 411. The terminal device sends second indication information to the network device, where the second indication information indicates the recommended configuration parameter of the at least one newly configured BWP.

Correspondingly, in step 411, the network device receives the second indication information sent by the terminal device.

It can be learned from the foregoing description that the at least one newly configured BWP is a BWP that the terminal device recommends the network device to newly configure for the terminal device in the first serving cell. Therefore, the terminal device may send the recommended configuration parameter of the newly configured BWP to the network device by using the second indication information. The network device may generate a BWP reconfiguration message based on the second indication information.

Optionally, the recommended configuration parameter may include the bandwidth and the center frequency.

Optionally, the recommended configuration parameter may include the bandwidth and the center frequency, but does not include the subcarrier spacing. During switching between different BWPs, the bandwidth and the center frequency require a large amount of calculation and a large amount radio frequency transition time, and have a great impact on the switching delay, and the subcarrier spacing requires a small amount of calculation and has a small impact on the switching delay. In this case, the recommended configuration parameter may not include the subcarrier spacing, and the network device may determine the subcarrier spacing of the new BWP by itself. In this way, signaling overheads can be reduced.

Optionally, the recommended configuration parameter may include the bandwidth, the center frequency, and the subcarrier spacing.

The bandwidth and the center frequency may be separately indicated. For example, a bandwidth size and a location of the center frequency are separately indicated. Alternatively, the bandwidth and the center frequency may be jointly indicated. For example, a resource indicator value (RIV) corresponding to the recommended BWP may be indicated. That is, the foregoing recommended configuration parameter may be reported in a form of joint coding.

It may be understood that, for a frequency domain location of the recommended BWP, another manner may also be used in addition to indicating the center frequency. For example, the recommended configuration parameter may include a frequency domain start location of the BWP, or a reference frequency domain location and a frequency offset for the reference frequency domain location are indicated.

Optionally, the second indication information may be sent before or after the first indication information is sent.

Optionally, the second indication information and the first indication information may be sent together, or may be sent separately. This is not limited in this application.

In other words, the second indication information and the first indication information may be carried in a same message, or carried in different messages.

Optionally, the second indication information and the first indication information are sent together, and both are carried in an RRC message. For example, the RRC message may include but is not limited to either of the following messages: UE assistance information or UE capability information.

Optionally, refer to FIG. 6. The method 400 further includes the following step.

Step 412. The network device sends the reconfiguration message to the terminal device, where the reconfiguration message is used to configure the at least one newly configured BWP for the terminal device based on the recommended configuration parameter.

Correspondingly, in step 412, the terminal device receives the reconfiguration message sent by the network device.

Specifically, after receiving the second indication information sent by the terminal device, the network device may generate the reconfiguration message based on the second indication information, and send the reconfiguration message to the terminal device. After receiving the reconfiguration message, the terminal device may reconfigure BWPs currently in the first serving cell, for example, add a new BWP or update an existing BWP.

Optionally, refer to FIG. 6. The method 400 further includes the following step.

Step 420. The network device sends an acknowledgment message to the terminal device, where the acknowledgment message indicates that the switching delay of the terminal device between the first BWP and the second BWP is the first duration.

Correspondingly, in step 420, the terminal device receives the acknowledgment message sent by the network device.

For step 420, refer to step 320 in the method 300. A difference is described herein.

In this embodiment, the acknowledgment message may include the reconfiguration message. In other words, the reconfiguration message may be used as the acknowledgment message to indicate that the switching delay of the terminal device between the first BWP and the second BWP takes effect as the first duration. In this case, a dedicated acknowledgment message may not be additionally sent, to reduce signaling overheads.

For example, after the terminal device sends the first indication information and the second indication information, if the terminal device receives the reconfiguration message, and the newly configured BWP meets a parameter configuration recommended by the terminal device, the terminal device may assume that the switching delay between the first BWP and the second BWP takes effect as the first duration.

For another example, after the terminal device sends the first indication information and the second indication information, if the terminal device does not receive the reconfiguration message, or the reconfigured BWP does not meet a parameter configuration recommended by the terminal device, the terminal device cannot assume that the switching delay between the first BWP and the second BWP takes effect as the first duration.

Similarly, in this embodiment, the first indication information may further indicate that a switching delay between a third BWP and a fourth BWP is third duration. The third BWP and the fourth BWP are uplink BWPs or downlink BWPs used by the terminal device to send and receive data.

Optionally, the third BWP and the fourth BWP may be any two of a plurality of downlink BWPs or a plurality of uplink BWPs configured by the network device for the terminal device in the first serving cell (or in another serving cell).

Optionally, at least one BWP in the third BWP and the fourth BWP may be a BWP that the terminal device recommends the network device to newly configure for the terminal device in the first serving cell (or in another serving cell).

In the communication method provided in the foregoing embodiment, the terminal device may determine a switching delay between two BWPs (for example, the first BWP and the second BWP) is the first duration, and report the first duration to the network device. However, the first duration may not meet a use requirement of the terminal device. For example, the first duration may be excessively long, and therefore may not meet a requirement of the terminal device for a low switching delay.

This application further provides a communication method. A terminal device can generate a recommended configuration parameter of a BWP based on a use requirement of the terminal device for a switching delay, and report the recommended configuration parameter of the BWP to a network device. The network device may configure a new BWP based on the recommended configuration parameter. Therefore, a switching delay between at least two BWPs in a serving cell can meet a requirement of the terminal device.

Figure 7:
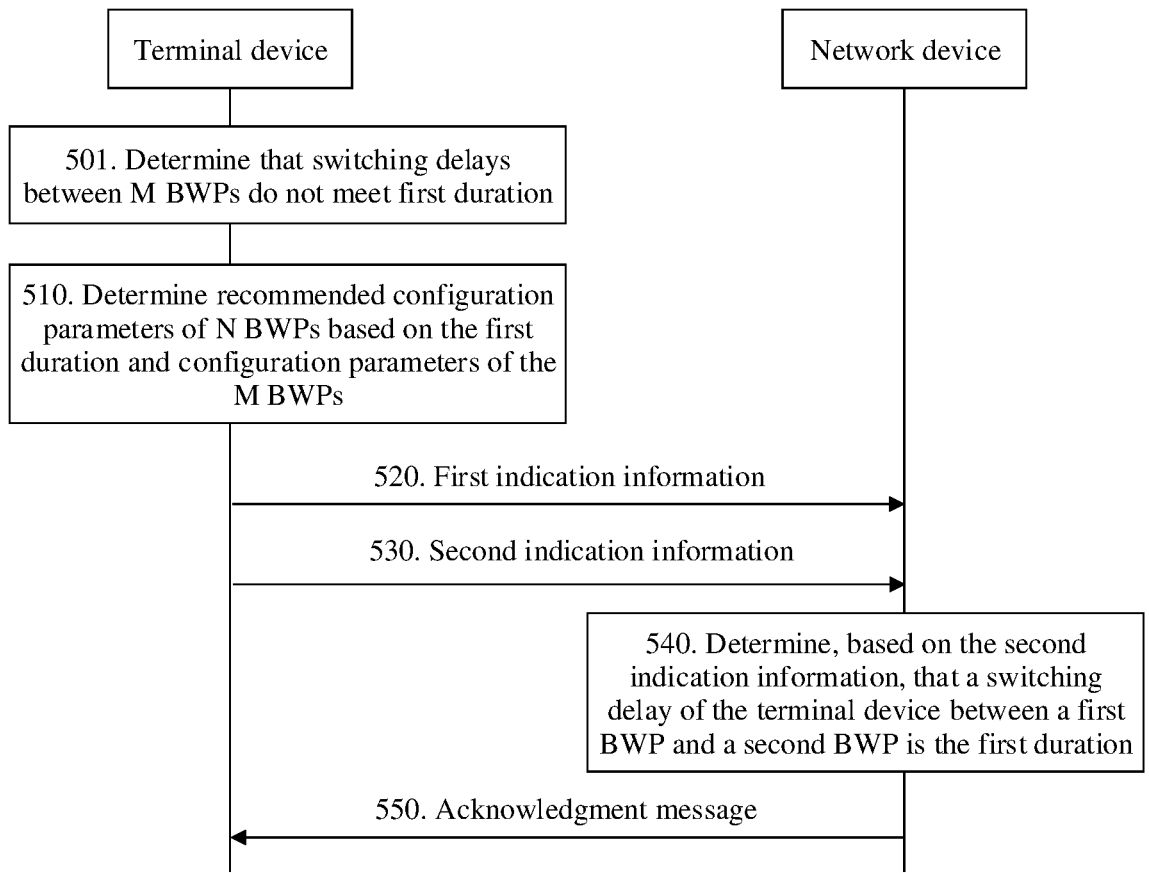
FIG. 7 is an example schematic flowchart of still another example of a communication method according to this application.

FIG. 7 is a schematic flowchart of a communication method 500 according to this application. The following describes the communication method 500 provided in the embodiments of this application with reference to FIG. 7. The method 500 includes the following steps.

Step 510. A terminal device determines recommended configuration parameters of N BWPs based on first duration and configuration parameters of M BWPs, where the M BWPs are BWPs that have been configured by a network device for the terminal device in a first serving cell, and M and N are integers greater than or equal to 1.

Step 520. The terminal device sends first indication information to the network device, where the first indication information indicates the recommended configuration parameters of the N BWPs.

Correspondingly, in step 520, the network device receives the first indication information sent by the terminal device.

Step 530. The terminal device sends second indication information to the network device, where the second indication information indicates that a switching delay of the terminal device between a first BWP and a second BWP is the first duration, and at least one of the first BWP and the second BWP is a BWP newly configured by the network device for the terminal device in the first serving cell based on the recommended configuration parameters of the N BWPs.

Correspondingly, in step 530, the network device receives the second indication information sent by the terminal device.

Step 540. The network device determines, based on the second indication information, that the switching delay of the terminal device between the first BWP and the second BWP is the first duration.

Specifically, the terminal device and the network device in this embodiment of this application may be communication devices in a TDD system, may be communication devices in an FDD system, or may be communication devices in any other system. This is not limited in this application.

Further, the network device may configure M downlink BWPs or M uplink BWPs for the terminal device in the first serving cell, where M is an integer greater than or equal to 1.

Optionally, a value of M may be 1. In this case, the network device configures only one uplink BWP or one downlink BWP for the terminal device in the first serving cell. For example, the one BWP may be an initial BWP.

Optionally, a value of M may be 4. In this case, the network device may configure four downlink BWPs or four uplink BWPs for the terminal device in the first serving cell.

In step 510, the terminal device determines the recommended configuration parameters of the N BWPs based on the first duration and the configuration parameters of the M BWPs.

Specifically, the terminal device determines the recommended configuration parameters of the N BWPs based on the first duration and the configuration parameters of the M BWPs, so that the network device generates a new BWP based on the recommended configuration parameters of the N BWPs. In this way, a switching delay between at least two BWPs in the first serving cell can meet the first duration.

It is easy to understand that the terminal device can determine, based on the first duration and in combination with calculation and processing capabilities of the terminal device, a calculation amount and an amount of processing time that are used when the terminal device performs BWP switching. The terminal device may further determine, based on the calculation amount and the processing time, which of the configuration parameters of the two BWPs may be the same, which may be different, and a magnitude of a difference between the different configuration parameters, and may determine the recommended configuration parameters of the N BWPs based on related information such as a bandwidth of the first serving cell.

For example, a value of N may be 1, that is, the network device is recommended to configure one new BWP. In this case, one of the current M BWPs may be used as a reference point, and a recommended configuration parameter of the BWP can be determined by using the reference point based on the foregoing determined calculation amount and processing time.

Optionally, a value of N may be 2, that is, the network device is recommended to configure two new BWPs. In this case, the M BWPs already configured in the first serving cell are not considered. The terminal device may randomly determine recommended configuration information of the two BWPs based on the calculation amount, the processing time, and information about the first serving cell.

Optionally, a value of N may be 2, that is, the network device is recommended to configure two new BWPs. In this case, one of the current M BWPs may be used as a reference point, and a recommended configuration parameter of the BWP can be determined by using the reference point based on the foregoing determined calculation amount and processing time. Then, the determined recommended configuration parameter of the BWP may be used as a reference point to determine a recommended configuration parameter of the remaining BWP.

It should be understood that the foregoing examples are enumerated for easier understanding of this application, but do not constitute a limitation on this application. How the terminal device determines the recommended configuration parameters of the N BWPs based on the first duration and the configuration parameters of the M BWPs is internally implemented inside the terminal device. This is not limited in this application. In addition, a value of N may alternatively be an integer greater than 2. For example, the value of N may be 3 or 4. That, the network device is recommended to configure three or four new BWPs. This is not limited in this application.

In a possible implementation, that the terminal device determines the recommended configuration parameters of the N BWPs based on the first duration and the configuration parameters of the M BWPs may be implemented in the following manner: The terminal device determines the recommended configuration parameters of the N BWPs based on the first duration, and compares the recommended configuration parameters of the N BWPs with the current configuration parameters of the M BWPs, to ensure that the newly determined recommended configuration parameters of the N BWPs are different from the configuration parameters of the configured M BWPs, that is, to ensure that the BWPs that are recommended to be newly configured are different from the configured M BWPs.

Optionally, the recommended configuration parameters of the N BWPs may include bandwidths and center frequencies of the N BWPs.

Optionally, the recommended configuration parameters of the N BWPs may include bandwidths and center frequencies of the N BWPs, but do not include subcarrier spacings of the N BWPs. During switching between different BWPs, the bandwidth and the center frequency require a large amount of calculation and a large amount radio frequency transition time, and have a great impact on the switching delay, and the subcarrier spacing requires a small amount of calculation and has a small impact on the switching delay. In this case, the recommended configuration parameters of the N BWPs may not include the subcarrier spacing, and the network device may determine the subcarrier spacing of the new BWP by itself. In this way, signaling overheads can be reduced.

Optionally, the recommended configuration parameters of the N BWPs may include bandwidths, center frequencies, and subcarrier spacings of the N BWPs.

For example, the terminal device may include a bandwidth size of a recommended BWP, a start location (e.g., a location of a start physical resource block (PRB)) of the recommended BWP, a central location (e.g., an identifier of a common resource block (CRB) at a center frequency or a center frequency location), and the like in the first indication information.

In another implementation, the recommended configuration parameters of the N BWPs may include resource indicator values (RIV) corresponding to the N BWPs. That is, the foregoing recommended configuration parameters may be reported in a form of joint coding.

Specifically, for a recommended BWP, the terminal device reports a resource indicator value. A bandwidth start location (start PRB) of the recommended BWP, and a bandwidth size (indicated by a quantity of resource blocks (RB)) of the recommended BWP may be calculated based on the resource indication value, a subcarrier spacing recommended by the terminal device for the BWP, a carrier offset corresponding to the recommended subcarrier spacing, and a specified BWP bandwidth constant.

In another implementation, the first indication information may include an identifier of a reference BWP, and the recommended configuration parameters of the BWPs include an offset relative to a configuration parameter of the reference BWP. For example, the offset may include a difference relative to a bandwidth of the reference BWP, an offset relative to a center frequency of the reference BWP, a difference (for example, a difference between values of u) relative to a subcarrier spacing of the reference BWP, and the like.

Optionally, the reference BWP may be any one of the M BWPs.

Optionally, the reference BWP may not belong to the M BWPs.

Optionally, the first indication information may include a BWP identifier of the reference BWP.

Optionally, the identifier of the reference BWP is a reference BWP ID, and the reference BWP is a BWP that has been configured by the network device for the terminal device.

Optionally, the identifier of the reference BWP is a configuration parameter of the reference BWP, and the reference BWP is a BWP that has been configured by the network device for the terminal device.

Optionally, the identifier of the reference BWP is a recommended configuration parameter of the reference BWP, and the reference BWP is a BWP that the terminal device recommends the network device to newly configure. After receiving the first indication information, the network device may configure a new BWP for the terminal device in the first serving cell based on the first indication information. For example, N new BWPs may be configured. The N new BWPs may include a BWP for reconfiguring the original M BWPs, or a newly added BWP. This is not limited in this application.

Specifically, the network device may send a BWP reconfiguration message (for example, carried in an RRC message) to the terminal device, and the terminal device may update a configuration parameter of the BWP based on the reconfiguration message, for example, release a previously configured BWP or add a new BWP.

In step 530, the terminal device sends the second indication information to the network device, where the second indication information indicates that the switching delay of the terminal device between the first BWP and the second BWP is the first duration, and at least one of the first BWP and the second BWP is a BWP newly configured by the network device for the terminal device in the first serving cell based on the recommended configuration parameters of the N.

Optionally, one of the first BWP and the second BWP is a BWP newly configured by the network device for the terminal device in the first serving cell based on the recommended configuration parameters of the N BWPs, and the other BWP is one of the M original BWPs.

Optionally, both of the first BWP and the second BWP are BWPs newly configured by the network device for the terminal device in the first serving cell based on the recommended configuration parameters of the N BWPs (where in this case, N is greater than or equal to 2).

Specifically, that the at least one of the first BWP and the second BWP is a BWP newly configured by the network device for the terminal device in the first serving cell based on the recommended configuration parameters of the N BWPs may also be understood as: At least one of the first BWP and the second BWP belongs to the N BWPs. For example, the N BWPs may include a BWP #1 and a BWP #2, and the first BWP and the second BWP may be the BWP #1 and the BWP #2 respectively.

It should be understood that, that the at least one of the first BWP and the second BWP is a BWP newly configured by the network device for the terminal device in the first serving cell based on the recommended configuration parameters of the N BWPs does not mean that the network device currently has completed configuration of the N BWPs.

Optionally, when sending the second indication information, the network device has not newly configured a BWP for the terminal device in the first serving cell based on the recommended configuration parameter of the N BWPs.

Optionally, the first indication information and the second indication information may be separately sent.

Optionally, the first indication information and the second indication information may be carried in a same message for simultaneous sending. For example, the first indication information and the second indication information may be carried in a same RRC message.

In step 540, after receiving the second indication information, the network device may determine, based on the second indication information, that the switching delay of the terminal device between the first BWP and the second BWP is the first duration.

Further, after the network device determines that the switching delay of the terminal device between the first BWP and the second BWP is the first duration, when a BWP used by the terminal device is switched between the first BWP and the second BWP, the network device and the terminal device may perform data transmission based on the first duration.

According to this embodiment of this application, the terminal device may determine a recommended configuration parameter of at least one BWP based on a specific delay requirement and a currently configured BWP, and report the recommended configuration parameter of the BWP to the network device. The network device may configure at least one new BWP based on the recommended configuration parameter, so that a switching delay between at least two BWPs in the serving cell can meet a use requirement.

Optionally, before step 510, the method 500 further includes the following step.

In step 501, the terminal device determines that switching delays between the M BWPs do not meet the first duration.

Specifically, the terminal device may determine the recommended configuration parameters of the N BWPs only when determining that the switching delays between the M BWPs do not meet the first duration, thereby reducing signaling overheads.

For example, a value of M is 1. In this case, there are no other BWPs that can be used in switching, and the terminal device may determine that the switching delays between the M BWPs do not meet the first duration.

For another example, a value of M may be greater than or equal to 2. In this case, there are a plurality of BWPs available for the terminal device to perform switching, and the terminal device may determine that a switching delay between any two of the M BWPs does not meet the first duration.

Specifically, the terminal device may determine the switching delay between any two BWPs based on the configuration parameters of the M BWPs. For example, the BWP #1 and the BWP #2 may be any two of the M BWPs. The terminal device may determine same configuration parameters and different configuration parameters of the BWP #1 and the BWP #2, and magnitudes of differences between the different configuration parameters, to determine a calculation amount and an amount of radio frequency transition time involved in switching between the BWP #1 and the BWP #2; and then may determine a switching delay between the BWP #1 and the BWP #2 based on the calculation capability and the processing capability of the terminal device. The terminal device may determine the switching delay between any two of the M BWPs by using the foregoing method, then compare the switching delay with the first duration, and determine that the switching delay between any two BWPs does not meet the first duration.

Optionally, that the switching delay between any two of the M BWPs does not meet the first duration may be that the switching delay between any two of the M BWPs is not equal to the first duration.

Optionally, that the switching delay between any two of the M BWPs does not meet the first duration may be that the switching delay between any two of the M BWPs is greater than the first duration.

Optionally, that the switching delay between any two of the M BWPs does not meet the first duration may be that a difference between the first duration and the switching delay between any two of the M BWPs is greater than a first threshold.

Optionally, that the switching delay between any two of the M BWPs does not meet the first duration may be that the switching delay between any two of the M BWPs is less than the first duration.

Optionally, that the switching delay between any two of the M BWPs does not meet the first duration may be that the switching delay between any two of the M BWPs is less than the first duration, and a difference between the first duration and the switching delay is greater than a second threshold.

Optionally, the first threshold and the second threshold may be specified in a protocol or a system, may be agreed upon between the network device and the terminal device, or may be determined by the terminal device based on a capability of the terminal device. This is not limited in this application.

Optionally, step 501 may further include a step of determining the first duration by the terminal device. Before the terminal device determines that the switching delay between any two of the M BWPs does not meet the first duration, the terminal device may determine a specific length of the first duration based on a specific requirement. This is not limited in this application. For example, the first duration determined by the terminal device needs to be greater than an amount of processing time required for switching of the maximum quantity of MIMO layers. The switching to the maximum quantity of MIMO layers involves switching between RF links and enabling and disabling of an antenna, and a specific amount of time is required.

Optionally, in step 510, the terminal device may further determine recommended BWP identifiers of the N BWPs. For example, the terminal device may determine the recommended BWP identifiers of the N BWPs based on a BWP configuration status in the first serving cell.

Optionally, in step 520, the first indication information indicates the recommended configuration parameters and the recommended BWP identifiers of the N BWPs.

Specifically, in a same serving cell, a quantity of BWPs configured by the network device may be limited, and recommended BWP identifiers of the N BWPs may be determined based on a current BWP configuration status of the terminal device.

For example, if a quantity (that is, a value of M) of currently configured BWPs does not reach an upper limit, an identifier of an unused BWP may be allocated to the N BWPs as a recommended identifier.

If the quantity of currently configured BWPs has reached the upper limit, some BWPs need to be reconfigured, or a configured BWP may be replaced with a recommended BWP. In this case, at least one of the recommended identifiers of the N BWPs needs to be the same as an identifier of at least one of the configured M BWPs.

For example, the values of M and N may both be 2, the identifiers of the M configured BWPs may be BWP ID 0 and BWP ID 1, and a maximum quantity of (uplink or downlink) BWPs configured for the terminal device in a same cell is 5. In this case, identifiers, namely, BWP ID 2 and BWP ID 3 (or BWP ID 4) of remaining BWPs may be allocated as recommended identifiers to two BWPs that are about to be configured.

For another example, the value of M may be 3, the value of N may be 2, the identifiers of the M configured BWPs may be BWP ID 0, BWP ID 1, and BWP ID 2, and a maximum quantity of (uplink or downlink) BWPs configured for the terminal device in a same cell is 5. In this case, an identifier, namely BWP ID 3 (or BWP ID 4) of a remaining BWP may be allocated as a recommended identifier to one BWP that is about to be configured. In this case, any one (for example, the BWP identified as BWP ID 2) of the three configured BWPs may be reconfigured. Therefore, the identifier BWP ID 2 can be allocated, as a recommended identifier, to the remaining BWP that is about to be configured.

For another example, the value of M may be 4, the value of N may be 2, the identifiers of the M configured BWPs may be BWP ID 0, BWP ID 1, BWP ID 2, and BWP ID 3. In this case, any two (for example, the BWPs identified as BWP ID 1 and BWP ID 2) of the four configured BWPs may be reconfigured. Therefore, the identifiers BWP ID 1 and BWP ID 2 may be allocated to two BWPs that are about to be configured.

The first indication information may further include the recommended identifiers of the N BWPs. After receiving the first indication information, the network device may allocate the recommended identifiers to corresponding BWPs based on the recommended configuration parameters and the recommended identifiers of the N BWPs, and generate the BWP reconfiguration message.

It should be understood that, when the value of N is greater than 1, the first indication information indicates recommended configuration parameters and recommended identifiers of at least two BWPs. Therefore, in the first indication information, a recommended configuration parameter and a recommended identifier of one BWP need to have an association relationship, to help the network device determine a specific correspondence.

Optionally, in step 530, the second indication information may include an identifier of the first BWP, an identifier of the second BWP, and indication information of the first duration.

For example, a BWP identifier of at least one of the first BWP and the second BWP is the same as at least one of the recommended identifiers of the N BWPs.

In other words, an identifier of at least one of the first BWP and the second BWP belongs to the recommended identifiers of the N BWPs.

It should be understood that, that at least one of the first BWP and the second BWP is a BWP newly configured by the network device for the terminal device in the first serving cell based on the recommended configuration parameters and the recommended identifiers of the N BWPs may be: The network device has newly configured the BWP for the terminal device in the first serving cell based on the recommended configuration parameters and the recommended identifiers of the N BWPs.

In another possible implementation, that at least one of the first BWP and the second BWP is a BWP newly configured by the network device for the terminal device in the first serving cell based on the recommended configuration parameters and the recommended identifiers of the N BWPs may be: The network device has not configured but is about to configure the BWP for the terminal device in the first serving cell based on the recommended configuration parameters and the recommended identifiers of the N BWPs.

Optionally, the method 500 further includes the following step.

Step 550. The network device sends an acknowledgment message to the terminal device, where the acknowledgment message indicates that the switching delay of the terminal device between the first BWP and the second BWP is the first duration.

Correspondingly, in step 550, the terminal device receives the acknowledgment message sent by the network device.

Optionally, the acknowledgment message may be carried in any one of the following messages: an RRC message, a MAC CE message, or a layer 1 message.

Optionally, the RRC message may include but is not limited to any one of the following messages: an RRC setup message, an RRC reject message, an RRC reconfiguration message, an RRC reestablishment message, an RRC release message, and an RRC resume message.

Optionally, the layer 1 message includes DCI.

In a possible implementation, the acknowledgment message may include the reconfiguration message. In other words, the reconfiguration message may be used as the acknowledgment message to indicate that the switching delay of the terminal device between the first BWP and the second BWP takes effect as the first duration.

For example, after the terminal device sends the first indication information and the second indication information, if the terminal device receives the reconfiguration message, and the newly configured BWP meets a parameter configuration recommended by the terminal device, the terminal device may assume that the switching delay between the first BWP and the second BWP takes effect as the first duration.

For another example, after the terminal device sends the first indication information and the second indication information, if the terminal device does not receive the reconfiguration message, or the reconfigured BWP does not meet a parameter configuration recommended by the terminal device, the terminal device cannot assume that the switching delay between the first BWP and the second BWP takes effect as the first duration.

An embodiment of this application further provides a communication method. A terminal device can report, to a network device for a specific BWP in a serving cell, a maximum quantity of MIMO layers applicable to the terminal device, so that indication of the maximum quantity of MIMO layers by the terminal device is more flexible and accurate. When the BWP is activated, a more matched quantity of MIMO layers can be used as the maximum quantity of MIMO layers to send and receive data, to improve transmission performance of the terminal device. When the terminal device sends and receives data at a BWP by using a small maximum quantity of MIMO layers, some antennas may be disabled, to reduce power consumption of the terminal device.

Figure 8:
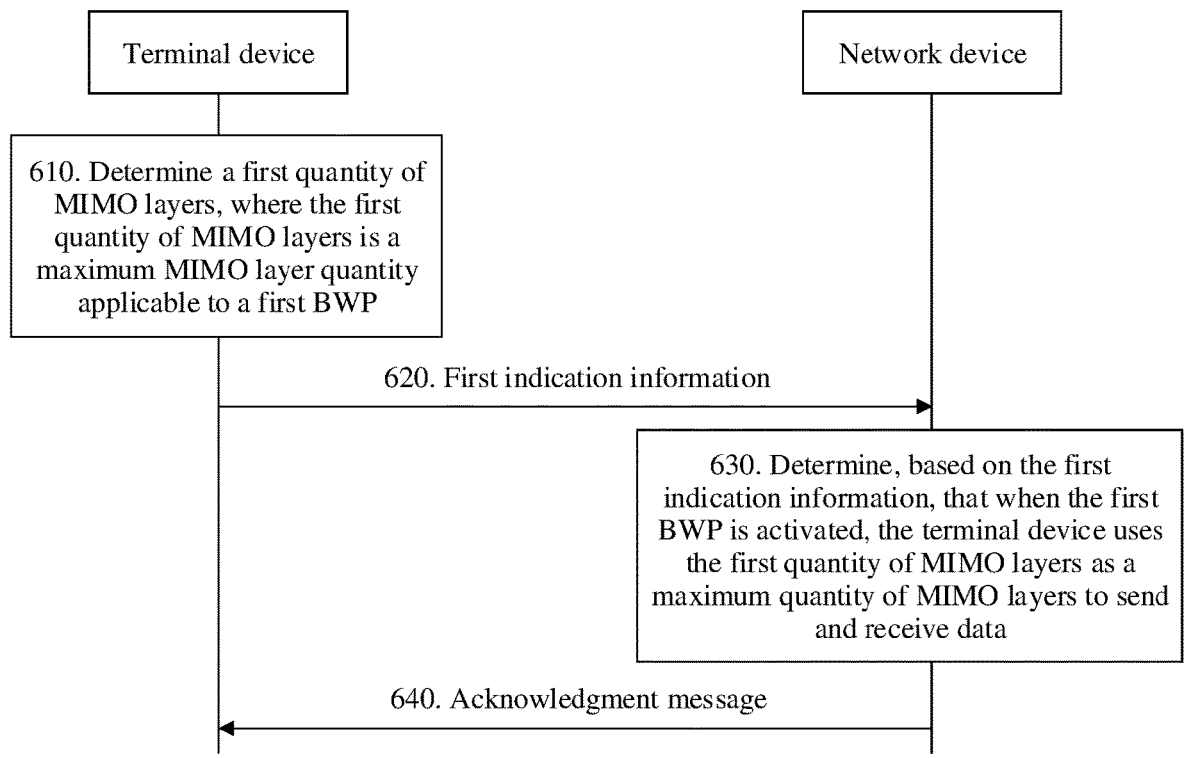
FIG. 8 is an example schematic flowchart of still another example of a communication method according to this application.

FIG. 8 is a schematic flowchart of a communication method 600 according to this application. The following describes the communication method 600 provided in the embodiments of this application with reference to FIG. 8. The method 600 includes the following steps.

Step 610. A terminal device determines a first quantity of MIMO layers, where the first quantity of MIMO layers is a maximum quantity of MIMO layers applicable to a first BWP, and the first BWP is an uplink BWP or a downlink BWP used by the terminal device to send and receive data in a first serving cell.

Step 620. The terminal device sends first indication information to a network device, where the first indication information includes an identifier of the first BWP and indication information of the first quantity of MIMO layers.

Correspondingly, in step 620, the network device receives the first indication information sent by the terminal device.

Step 630. The network device determines, based on the first indication information, that when the first BWP is activated, the terminal device uses the first quantity of MIMO layers as a maximum quantity of MIMO layers to send and receive data.

Specifically, the terminal device and the network device in this embodiment of this application may be communication devices in a TDD system, may be communication devices in an FDD system, or may be communication devices in any other system. This is not limited in this application.

Further, the network device may configure a plurality of downlink BWPs and a plurality of uplink BWPs for the terminal device in the first serving cell, to meet different use requirements of the terminal device.

Optionally, the plurality of BWPs may include an initial BWP, which is a BWP used after the terminal device initially accesses a cell or a broadband carrier in an idle state.

Optionally, the plurality of BWPs may include a default BWP, so that the terminal device switches from a current active BWP to the default BWP, to save power.

Optionally, the terminal device may be in a carrier aggregation scenario, the terminal device may have a plurality of serving cells, and the first serving cell may be one of the plurality of serving cells.

Optionally, the network device may configure a plurality of uplink BWPs and a plurality of downlink BWPs for the terminal device in other serving cells different from the first serving cell.

In this embodiment of this application, the first BWP may be any one of the plurality of downlink BWPs or the plurality of uplink BWPs configured by the network device for the terminal device in the first serving cell.

For example, the first BWP may be any one of the plurality of downlink BWPs.

For another example, the first BWP may be any one of the plurality of uplink BWPs.

For another example, the first BWP may be the initial BWP.

For another example, the first BWP may be the default BWP.

Optionally, the first BWP may alternatively be a BWP that the terminal device recommends the network device to newly configure for the terminal device in the first serving cell.

In step 610, the terminal device may determine the first quantity of MIMO layers, where the first quantity of MIMO layers is the maximum quantity of MIMO layers applicable to the first BWP.

Specifically, the first quantity of MIMO layers is the maximum quantity of MIMO layers applicable to the first BWP. To be specific, when the terminal device uses the first BWP, the terminal device may use the first quantity of MIMO layers as a maximum quantity of MIMO layers to send and receive data. In other words, when the first BWP is activated, the first quantity of MIMO layers may be used as the maximum quantity of MIMO layers to send and receive data.

Optionally, the first quantity of MIMO layers is applicable only to the first BWP, and the first quantity of MIMO layers is not applicable to another BWP in the first serving cell.

In step 620, the terminal device sends the first indication information to the network device, where the first indication information includes the identifier of the first BWP and the indication information of the first quantity of MIMO layers.

Specifically, after determining the first quantity of MIMO layers, the terminal device may report the first quantity of MIMO layers to the network device, so that the network device may determine, based on the reported content (that is, based on the first indication information), the maximum quantity of MIMO layers applicable to the first BWP. In this embodiment of this application, the first indication information includes the identifier of the first BWP. The identifier of the BWP may be a BWP identifier. For example, if the identifier of the first BWP is BWP ID 1, the first indication information may include BWP ID 1.

It may be understood that the identifier of the BWP may alternatively be other indication information, for example, a BWP configuration parameter.

In addition, the first indication information in this embodiment of this application further includes the indication information of the first quantity of MIMO layers. The indication information of the first quantity of MIMO layers may indicate the first quantity of MIMO layers. The indication information of the first quantity of MIMO layers may exist in a plurality of forms. This is not limited in this application.

Optionally, the indication information of the first quantity of MIMO layers may include a value of the first quantity of MIMO layers.

For example, the indication information of the first quantity of MIMO layers may include a field, and a value of the first quantity of MIMO layers may be a decimal value represented by the field. For example, fields 001, 010, 011, and 100 may indicate that values of the first quantity of MIMO layers are 1, 2, 3, and 4 respectively.

For another example, the indication information of the first quantity of MIMO layers may be an index value of the first quantity of MIMO layers. For example, an index value 0 indicates that the first quantity of MIMO layers is 4, and an index value 1 indicates that the first quantity of MIMO layers is 2.

Optionally, in the carrier aggregation scenario, the first serving cell may be any one of the plurality of serving cells of the terminal device, and the first indication information may further include an identifier of the first serving cell.

It is easy to understand that if only the identifier of the first BWP is reported to the network device, the network device may not know a specific serving cell to which the first BWP belongs. Therefore, the first indication information may further include the identifier of the first serving cell, so that the network device can determine the specific serving cell to which the first BWP belongs.

In this embodiment of this application, the first indication information may be carried in an RRC message or another message. This is not limited in this application. For example, when the first indication information is carried in an RRC message, the RRC message may include but is not limited to either of the following messages: UE assistance information and UE capability information.

It should be understood that a BWP in which the first indication information is sent is not limited in this embodiment of this application.

Optionally, the first indication information may be sent by using any one of a plurality of uplink BWPs in the first serving cell.

Optionally, the first BWP may be an uplink BWP, and the first indication information may be sent in the first BWP.

Optionally, the terminal device may be in a carrier aggregation scenario, that is, the terminal device may have a plurality of serving cells, and the first indication information may be sent by using any serving cell other than the first serving cell in the plurality of serving cells.

For example, the first indication information may be sent by using any uplink BWP in a serving cell other than the first serving cell.

In step 630, the network device may determine, based on the first indication information, that when the first BWP is activated, the terminal device uses the first quantity of MIMO layers as a maximum quantity of MIMO layers to send and receive data.

Specifically, the first indication information includes the identifier of the first BWP, and further includes the indication information of the first quantity of MIMO layers. After receiving the first indication information including the foregoing content, according to a system or a protocol specification, or an agreement between the network device and the terminal device, the network device can determine that when the first BWP is activated, the terminal device uses the first quantity of MIMO layers as a maximum quantity of MIMO layers to send and receive data.

It should be understood that in the embodiments of this application, the "protocol" may be a standard protocol in the communication field, for example, may include an LTE protocol, an NR protocol, and a related protocol applied to a future communication system. This is not limited in this application.

Further, after the network device determines that when the first BWP is activated, the terminal device uses the first quantity of MIMO layers as a maximum quantity of MIMO layers to send and receive data, the network device and the terminal device may perform data transmission based on the first quantity of MIMO layers. That is, after the terminal device successfully sends the first indication information, and the network device successfully receives the first indication information, when the first BWP is activated, the terminal device uses the first quantity of MIMO layers as a maximum quantity of MIMO layers to send and receive data.

For example, the first BWP is a downlink BWP. When the first BWP is activated, the terminal device may use the first quantity of MIMO layers as a maximum quantity of MIMO layers to receive a PDSCH sent by the network device.

For another example, the first BWP is an uplink BWP. When the first BWP is activated, the terminal device may use the first quantity of MIMO layers as a maximum quantity of MIMO layers to send a PUSCH to the network device.

In conclusion, in this embodiment of this application, the terminal device determines the first quantity of MIMO layers that is the maximum quantity of MIMO layers applicable to the first BWP, and sends the first indication information to the network device. The first indication information includes the identifier of the first BWP and the indication information of the first quantity of MIMO layers. After receiving the first indication information, the network device can determine that when the first BWP is activated, the first quantity of MIMO layers is used as the maximum quantity of MIMO layers to send and receive data.

Compared with a case in which the terminal device reports a maximum quantity of MIMO layers at a cell granularity (where the maximum quantity of MIMO layers applies to all BWPs in the cell), in this embodiment of this application, the terminal device can determine a maximum quantity of MIMO layers of a specific BWP in a serving cell and indicate the maximum quantity of MIMO layers to the network device, so that indication of the maximum quantity of MIMO layers is more flexible and an indication result is more accurate. When the first BWP is activated, the terminal device may use a more matched quantity of MIMO layers as a maximum quantity of MIMO layers to send and receive data. This can improve performance of data transmission between the terminal device and the network device, and can reduce power consumption of the terminal device.

In this embodiment of this application, the first quantity of MIMO layers may be less than a second quantity of MIMO layers, and the second quantity of MIMO layers is a maximum quantity of MIMO layers configured by the network device for the first serving cell.

For example, the first quantity of MIMO layers determined by the terminal device is 2, and the maximum quantity of MIMO layers configured by the network device for the terminal device in the first serving cell may be 4. In other words, in this case, the first quantity of MIMO layers is less than the second quantity of MIMO layers.

It can be learned from the foregoing description that the maximum quantity of MIMO layers configured by the network device for the terminal device in the first serving cell is at a cell granularity, and the maximum quantity of MIMO layers is applicable to all BWPs in the first serving cell. However, configuration parameters of different BWPs are different. The maximum quantity of MIMO layers may not be proper for some BWPs. In addition, using a same maximum quantity of MIMO layers to send and receive data in different BWPs does not help reduce power consumption of the terminal device.

For example, the terminal device may not need to use the maximum quantity of MIMO layers in some BWPs (where, for example, a BWP with a small bandwidth has a low data rate) to send or receive data. In this case, the terminal device has to enable some unnecessary antennas to support the configured maximum quantity of MIMO layers. Therefore, energy of the terminal device is inefficiently saved.

Optionally, the first BWP is a downlink BWP, and the second quantity of MIMO layers is a maximum quantity of MIMO layers configured for the terminal device in the first serving cell, for receiving a PDSCH.

Optionally, the first BWP is an uplink BWP, and the second quantity of MIMO layers is a maximum quantity of MIMO layers configured for the terminal device in the first serving cell, for sending a PUSCH.

In this embodiment of this application, the terminal device determines the maximum quantity of MIMO layers for the first BWP (that is, determines the first quantity of MIMO layers), where the first quantity of MIMO layers is less than the second quantity of MIMO layers. Therefore, when the first BWP is activated, a more matched quantity of MIMO layers can be used as the maximum quantity of MIMO layers to send and receive data, to improve data transmission performance of the terminal device. In addition, in this case, the terminal device may disable some unnecessary antennas (that is, the terminal device may use fewer antennas), thereby reducing energy consumption of the terminal device.

In another implementation, the first quantity of MIMO layers is less than a third quantity of MIMO layers, and the third quantity of MIMO layers is a maximum quantity of MIMO layers indicated in a capability message reported by the terminal device for the first serving cell.

In some cases, the terminal device may need to determine the first quantity of MIMO layers before the network device has time to configure the second quantity of MIMO layers for the terminal device. In this case, the third quantity of MIMO layers may be used as a reference to determine that the first quantity of MIMO layers is less than the third quantity of MIMO layers.

Optionally, the first BWP is a downlink BWP, and the third quantity of MIMO layers is a maximum quantity of MIMO layers for receiving a PDSCH and indicated in a capability message reported by the terminal device for the first serving cell.

Optionally, the first BWP is an uplink BWP, and the third quantity of MIMO layers is a maximum quantity of MIMO layers for sending a PUSCH and indicated in a capability message reported by the terminal device for the first serving cell.

A method for determining the first quantity of MIMO layers by the terminal device is not limited in this application. For example, the terminal device may determine the first quantity of MIMO layers based on the configuration parameter of the first BWP.

Optionally, the configuration parameter may include at least one of a bandwidth, a center frequency, and a subcarrier spacing.

Optionally, the first quantity of MIMO layers may be determined based on a bandwidth of the first BWP. For example, for a BWP with a small bandwidth, a data rate is generally low. In this case, a small first quantity of MIMO layers may be correspondingly configured.

Optionally, the first quantity of MIMO layers may be determined based on a subcarrier spacing of the first BWP. For example, a BWP with a small subcarrier spacing may have a low requirement on a delay. In this case, a small first quantity of MIMO layers may be correspondingly configured.

Optionally, the first quantity of MIMO layers may be determined based on a center frequency of the first BWP. For example, a BWP with a low center frequency may have a low requirement on a delay. In this case, a small first quantity of MIMO layers may be correspondingly configured.

In this embodiment of this application, after sending the first indication information, the terminal device may consider by default that the network device has received the first indication information, and that the network device determines that when the first BWP is activated, the terminal device uses the first quantity of MIMO layers as a maximum quantity of MIMO layers to send and receive data.

In addition, in another implementation, after receiving the first indication information and determining, based on the first indication information, that when the first BWP is activated, the terminal device uses the first quantity of MIMO layers as a maximum quantity of MIMO layers to send and receive data, the network device may feed back an acknowledgment message to the terminal device. The terminal device considers, only after receiving the acknowledgment message, that the first quantity of MIMO layers applicable to the first BWP takes effect.

Optionally, refer to FIG. 8. The method 600 further includes the following step.

Step 640. The network device sends the acknowledgment message to the terminal device, where the acknowledgment message indicates that when the terminal device uses the first BWP, the terminal device uses the first quantity of MIMO layers as a maximum quantity of MIMO layers to send and receive data.

Correspondingly, in step 640, the terminal device receives the acknowledgment message sent by the network device.

Optionally, the acknowledgment message may be carried in any one of the following messages: an RRC message, a MAC CE message, or a layer 1 message.

Optionally, the RRC message may include but is not limited to any one of the following messages: an RRC setup message, an RRC reject message, an RRC reconfiguration message, an RRC reestablishment message, an RRC release message, and an RRC resume message.

Optionally, the layer 1 message includes DCI.

In this embodiment of this application, in addition to determining the maximum quantity of MIMO layers applicable to the first BWP, the terminal device may further determine the maximum quantity of MIMO layers applicable to another BWP, and then report the maximum quantity of MIMO layers to the network device. This is not limited in this application.

Optionally, in step 610, the terminal device may further determine a fourth quantity of MIMO layers, where the fourth quantity of MIMO layers is a maximum quantity of MIMO layers applicable to a second BWP. The second BWP is any one of the plurality of downlink BWPs or the plurality of uplink BWPs configured by the network device for the terminal device in the first serving cell.

For example, the terminal device and the network device are in a TDD system, the first BWP is a downlink BWP, and the second BWP may be an uplink BWP bound to the first BWP. The two BWPs have a same identifier and a same center frequency. An advantage of the foregoing configuration is that, for the TDD system, when a downlink/uplink BWP is switched, an uplink/downlink BWP bound to the downlink/uplink BWP also needs to be switched. In this case, maximum quantities of MIMO layers applicable to the uplink and downlink BWPs bound to each other may be indicated together.

In step 620, the first indication information further includes an identifier of the second BWP and indication information of the fourth quantity of MIMO layers.

In other words, in addition to carrying the identifier of the first BWP and the indication information of the first quantity of MIMO layers, the first indication information may further carry the identifier of the second BWP and the indication information of the fourth quantity of MIMO layers, to reduce signaling overheads.

It should be understood that in this case, in the first indication information, the identifier of the first BWP needs to be associated with the indication information of the first quantity of MIMO layers, and the identifier of the second BWP needs to be associated with the indication information of the fourth quantity of MIMO layers, to help the network device determine a specific correspondence.

Optionally, the first quantity of MIMO layers is equal to the fourth quantity of MIMO layers. In this case, the first indication information may carry the identifier of the first BWP, the identifier of the second BWP, and indication information of a single quantity of MIMO layers, so that signaling overheads can be reduced.

Optionally, the terminal device may determine maximum quantities of MIMO layers used only for some BWPs rather than all BWPs in the first serving cell.

Optionally, in the carrier aggregation scenario, the second BWP may alternatively be any one of a plurality of downlink BWPs or a plurality of uplink BWPs that are configured by the network device for the terminal device in a serving cell different from the first serving cell.

Optionally, in the carrier aggregation scenario, when the terminal device has a plurality of serving cells, the first indication information needs to further include an identifier of the first serving cell in which the first BWP is located, and an identifier of a serving cell in which the second BWP is located.

In this embodiment of this application, the terminal device may further continue to report a capability message to the network device, to indicate the maximum quantity of MIMO layers supported by the first serving cell, so that the network device configures, based on the maximum quantity of MIMO layers, a maximum quantity of MIMO layers applicable to another BWP not indicated by the first indication information.

In another embodiment, the first BWP may alternatively be a BWP that the terminal device recommends the network device to newly configure. Specifically, the terminal device may determine a recommended configuration parameter of a new BWP, and determine a maximum quantity of MIMO layers of the BWP that is recommended to be configured, that is, the first quantity of MIMO layers. Therefore, the identifier of the first BWP included in the first indication information may be a recommended BWP configuration parameter. In this way, the network device may configure a new BWP based on the recommended configuration parameter, and determine that the first quantity of MIMO layers is used as the maximum quantity of MIMO layers to send and receive data in the new BWP. Correspondingly, the acknowledgment message may include the BWP reconfiguration message. In addition, the first indication information may further include a recommended BWP identifier of the BWP that is recommended to be configured.

For a method and a procedure for determining the recommended BWP configuration parameter, the BWP reconfiguration information, the recommended BWP identifier of the recommended BWP, and that the first quantity of MIMO layers is used as the maximum quantity of MIMO layers to send and receive data when the first BWP is activated, refer to the embodiments shown in FIG. 6 and FIG. 7.

Figure 9:
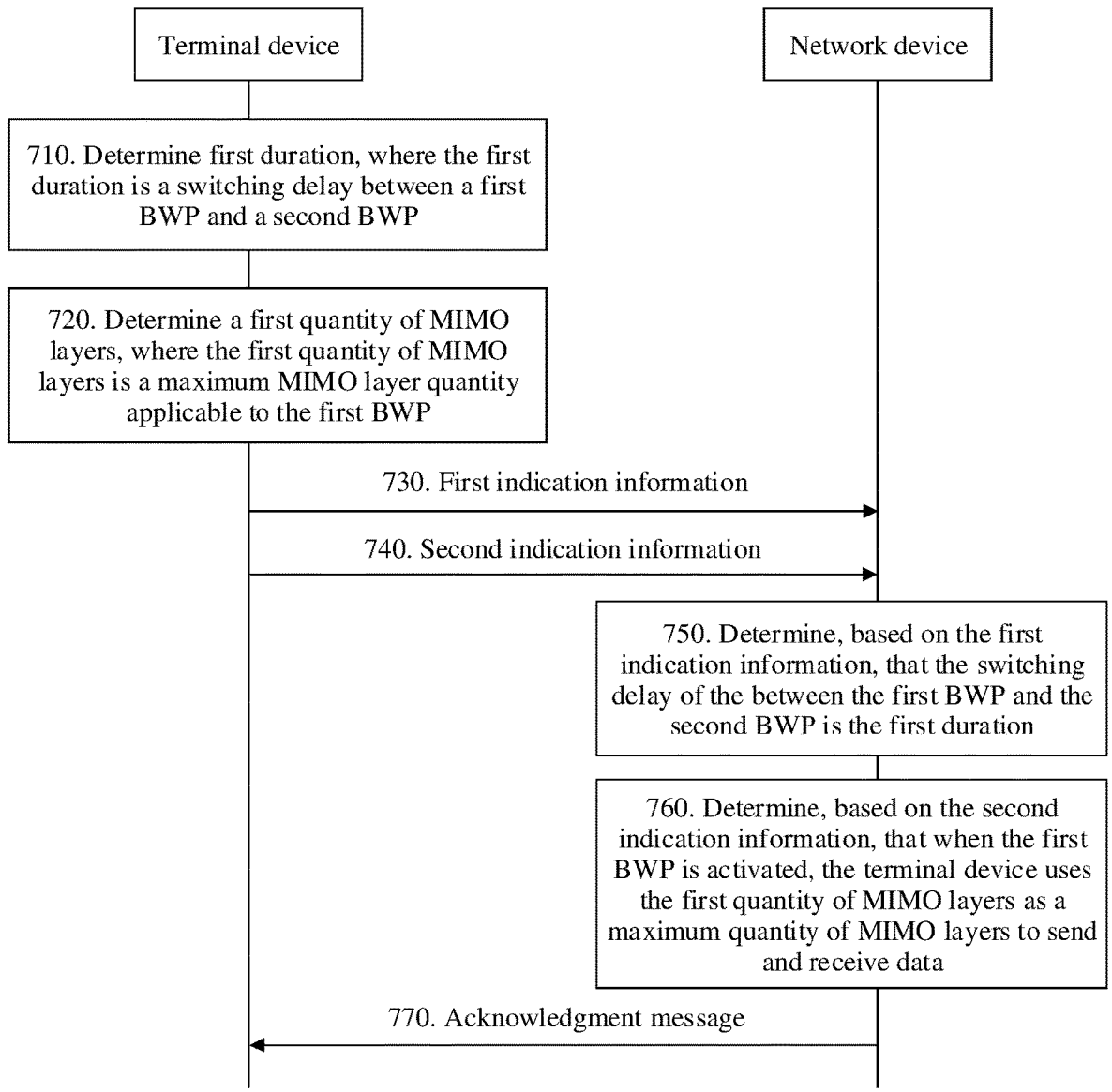
FIG. 9 is an example schematic flowchart of still another example of a communication method according to this application.

FIG. 9 is a schematic flowchart of a communication method 700 according to this application. The following describes the communication method 700 provided in the embodiments of this application with reference to FIG. 9. The method 700 includes the following steps.

Step 710. A terminal device determines first duration, where the first duration is a switching delay between a first BWP and a second BWP. The first BWP and the second BWP are any two of a plurality of downlink BWPs or a plurality of uplink BWPs that are configured by a network device for the terminal device in a first serving cell.

Step 720. The terminal device determines a first quantity of MIMO layers, where the first quantity of MIMO layers is a maximum quantity of MIMO layers applicable to the first BWP, and the first BWP is any one of a plurality of BWPs configured by the network device for the terminal device in the first serving cell.

Step 730. The terminal device sends first indication information to the network device, where the first indication information includes identifiers of the first BWP and the second BWP and indication information of first duration.

Correspondingly, in step 730, the network device receives the first indication information sent by the terminal device.

Step 740. The terminal device sends second indication information to the network device, where the second indication information includes the identifier of the first BWP and indication information of the first quantity of MIMO layers.

Correspondingly, in step 740, the network device receives the second indication information sent by the terminal device.

Step 750. The network device determines, based on the first indication information, that the switching delay between the first BWP and the second BWP is the first duration.

Step 760. The network device determines, based on the second indication information, that when the first BWP is activated, the terminal device uses the first quantity of MIMO layers as a maximum quantity of MIMO layers to send and receive data.

For steps 710 to 760, refer to steps 301 to 320 in the method 300 and steps 610 to 630 in the method 600. A difference is described herein.

In this embodiment of this application, the first indication information and the second indication information may be separately sent, for example, may be carried in different reported messages. In addition, the first indication information and the second indication information may alternatively be sent together, for example, may be carried in a same reported message.

Optionally, the reported message may be an RRC message. For example, the RRC message may be UE assistance information or UE capability information.

In this embodiment of this application, the first duration needs to have a minimum value. For example, the first duration needs to be greater than or equal to the processing time required by the terminal device for switching of the maximum quantity of MIMO layers. In this way, it can be ensured that the terminal device can implement switching of the maximum quantity of MIMO layers within the first duration.

The processing time required for switching the maximum quantity of MIMO layers includes an amount of time for PDCCH demodulation and DCI decoding, and an amount of time for enabling or disabling an RF link, for example, an amount of time for enabling or disabling an antenna.

In a specific example, the first BWP and the second BWP are downlink BWPs, and the maximum quantity of MIMO layers, for receiving a PDSCH, configured by the network device for the first serving cell is 4 (that is, a maximum quantity of MIMO layers applicable to another BWP (for example, the second BWP) in the first serving cell is 4), the first duration is three slots, and the first quantity of MIMO layers is 2. Therefore, when the BWP used by the terminal device is switched from the second BWP to the first BWP, the terminal device needs to complete BWP switching in three slots, and needs to ensure that after the BWP is switched to the first BWP, the maximum quantity of MIMO layers for receiving the PDSCH by the terminal device is 2. In other words, RF link adjustment, for example, antenna quantity adjustment, needs to be completed in the three slots.

Optionally, the method 700 further includes the following step.

Step 770. The network device sends an acknowledgment message to the terminal device, where the acknowledgment message indicates that the switching delay between the first BWP and the second BWP is the first duration, and indicates that when the terminal device uses the first BWP, the terminal device uses the first quantity of MIMO layers as a maximum quantity of MIMO layers to send and receive data.

Correspondingly, in step 770, the terminal device receives the acknowledgment message sent by the network device.

Optionally, the acknowledgment message may be carried in an RRC message, a MAC CE message, or a DCI message.

Optionally, in another implementation, the terminal device may separately send an acknowledgment message to the terminal device for the first indication information and the second indication information. This is not limited in this application.

It may be understood that, in the embodiments described in the present technology, in addition to an identifier indicating one BWP, the information reported by the UE needs to further include information indicating that the BWP is an uplink BWP or a downlink BWP.

The communication methods in the embodiments of this application are described above in detail with reference to FIG. 1 to FIG. 9. The following describes in detail apparatuses in the embodiments of this application with reference to FIG. 10 to FIG. 13. It should be understood that the apparatuses shown in FIG. 10 to FIG. 13 can implement one or more steps in the method procedures shown in FIG. 4 to FIG. 9.

Figure 10:
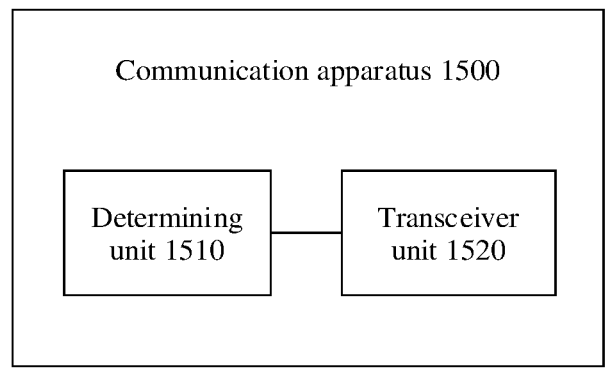
FIG. 10 is an example schematic diagram of a communication device according to an embodiment of this application.

FIG. 10 is a schematic diagram of a communication device according to an embodiment of this application. A communication apparatus 1500 shown in FIG. 10 includes a determining unit 1510 and a transceiver unit 1520.

The transceiver unit 1520 is configured to send first indication information to a network device, where the first indication information indicates that a switching delay between a first bandwidth part BWP and a second BWP is first duration, where the first BWP and the second BWP are uplink BWPs or downlink BWPs used by the communication apparatus to send and receive data.

Optionally, the first indication information includes an identifier of the first BWP, an identifier of the second BWP, and indication information of the first duration.

Optionally, the determining unit 1510 is configured to determine the first duration before the transceiver unit 1520 sends the first indication information to the network device.

Optionally, the first BWP and the second BWP are any two of a plurality of downlink BWPs configured by the network device for the communication apparatus 1500 in a first serving cell, or the first BWP and the second BWP are any two of a plurality of uplink BWPs configured by the network device for the communication apparatus 1500 in a first serving cell.

Optionally, at least one BWP in the first BWP and the second BWP is a BWP that the communication apparatus 1500 recommends the network device to configure for the communication apparatus 1500 in the first serving cell.

Optionally, the transceiver unit 1520 is further configured to send second indication information to the network device, where the second indication information indicates a recommended configuration parameter of the at least one BWP.

Optionally, the transceiver unit 1520 is further configured to receive a reconfiguration message sent by the network device, where the reconfiguration message is used to configure the at least one BWP for the communication apparatus 1500 based on the recommended configuration parameter.

Optionally, the first duration is shorter than second duration, and the second duration is a switching delay that is between the first BWP and the second BWP and that is determined based on a BWP switching delay capability type of the communication apparatus 1500.

Optionally, the determining unit 1510 determines the first duration based on configuration parameters of the first BWP and the second BWP.

Optionally, the configuration parameters of the first BWP and the second BWP meet at least one of the following conditions: A difference between center frequencies of the first BWP and the second BWP is less than or equal to a first threshold; a difference between bandwidths of the first BWP and the second BWP is less than or equal to a second threshold; and a difference between subcarrier spacings of the first BWP and the second BWP is less than or equal to a third threshold.

Optionally, the transceiver unit 1520 is further configured to receive an acknowledgment message sent by the network device, where the acknowledgment message indicates that the switching delay of the communication apparatus 1500 between the first BWP and the second BWP is the first duration.

Optionally, the first serving cell is any one of a plurality of serving cells of the communication apparatus 1500, and the first indication information further includes a cell identifier of the first serving cell.

Optionally, the indication information of the first duration includes a value of the first duration or an index value of the first duration.

Optionally, the first indication information further indicates that a switching delay between a third BWP and a fourth BWP is third duration.

In another implementation, the determining unit 1510 is configured to determine a first quantity of MIMO layers, where the first quantity of MIMO layers is a maximum quantity of MIMO layers applicable to a first bandwidth part BWP, and the first BWP is an uplink BWP or a downlink BWP used by the communication apparatus to send and receive data in a first serving cell.

The transceiver unit 1520 is configured to send first indication information to a network device, where the first indication information includes an identifier of the first BWP and indication information of the first quantity of MIMO layers.

Optionally, the first quantity of MIMO layers is less than a second quantity of MIMO layers, and the second quantity of MIMO layers is a maximum quantity of MIMO layers configured by the network device for the first serving cell.

Optionally, the first quantity of MIMO layers is less than a third quantity of MIMO layers, and the third quantity of MIMO layers is a maximum quantity of MIMO layers indicated in a capability message reported by the communication apparatus 1500 for the first serving cell.

Optionally, the determining unit 1510 determines the first quantity of MIMO layers based on a configuration parameter of the first BWP.

Optionally, the transceiver unit 1520 is further configured to receive an acknowledgment message sent by the network device, where the acknowledgment message indicates that when the communication apparatus 1500 uses the first BWP, the communication apparatus uses the first quantity of MIMO layers as a maximum quantity of MIMO layers to send and receive data.

Optionally, the first serving cell is any one of a plurality of serving cells of the communication apparatus 1500, and the first indication information further includes a cell identifier of the first serving cell.

Optionally, the first indication information includes an identifier of a second BWP and indication information of a fourth quantity of MIMO layers, and the fourth quantity of MIMO layers is a maximum quantity of MIMO layers that is determined by the determining unit 1510 and that is applicable to the second BWP.

In another implementation, the determining unit 1510 is configured to determine recommended configuration parameters of N BWPs based on first duration and configuration parameters of M BWPs, where the M BWPs are BWPs that have been configured by a network device for the communication apparatus 1500 in a first serving cell, and M and N are integers greater than or equal to 1.

The transceiver unit 1520 is configured to send first indication information to the network device, where the first indication information indicates the recommended configuration parameters of the N BWPs.

The transceiver unit 1520 is further configured to send second indication information to the network device, where the second indication information indicates that a switching delay between a first BWP and a second BWP is the first duration, and at least one of the first BWP and the second BWP is a BWP newly configured by the network device for the communication apparatus 1500 in the first serving cell based on the recommended configuration parameters of the N BWPs.

Optionally, the determining unit 1510 is further configured to determine that switching delays between the M BWPs do not meet the first duration.

Optionally, the transceiver unit 1520 is further configured to receive an acknowledgment message sent by the network device, where the acknowledgment message indicates that the switching delay of the communication apparatus 1500 between the first BWP and the second BWP is the first duration.

Optionally, the transceiver unit 1520 is further configured to receive a reconfiguration message sent by the network device, where the reconfiguration message is used to configure the at least one BWP for the terminal device based on the recommended configuration parameters of the N BWPs.

Optionally, the acknowledgment message includes the reconfiguration message.

Optionally, the recommended configuration parameters of the N BWPs include bandwidth information and center frequency information of the N BWPs.

Optionally, the recommended configuration parameters of the N BWPs include resource indication values corresponding to the N BWPs.

Optionally, the first indication information includes a configuration parameter of a reference BWP, and the recommended configuration parameters include an offset relative to the configuration parameter of the reference BWP.

In a possible implementation, the communication apparatus 1500 may be a terminal device 70. A function of the determining unit may be implemented by a processor 702 in the terminal device, and a function of the transceiver unit may be implemented by using a transceiver 701 (in other words, a control circuit and an antenna) in the terminal device. The following describes a structure of a terminal device in an embodiment of this application with reference to FIG. 11.

Figure 11:
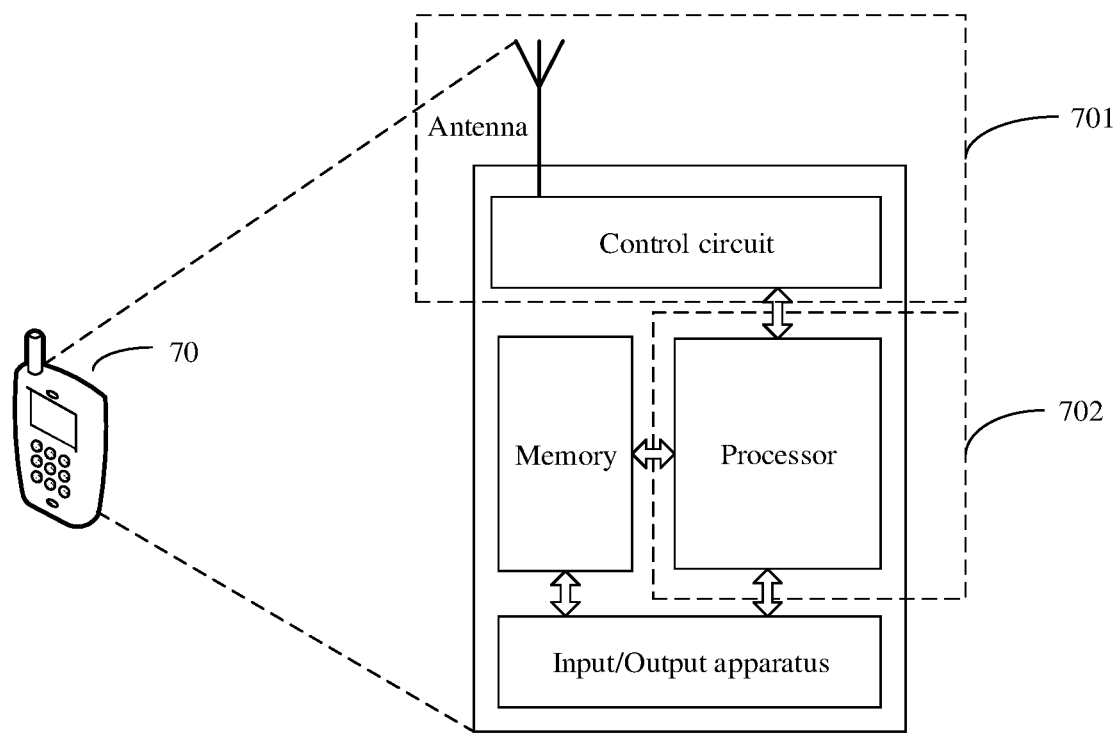
FIG. 11 is an example schematic diagram of a structure of a terminal device according to an embodiment of this application.

FIG. 11 is a schematic diagram of a structure of a terminal device according to an embodiment of this application. The terminal device is used in the system shown in FIG. 1, and performs functions of the terminal device in the foregoing method embodiments. For ease of description, FIG. 11 shows only main components of the terminal device. As shown in FIG. 11, the terminal device 70 includes a processor, a memory, a control circuit, an antenna, and an input/output apparatus. The processor is mainly configured to: process a communication protocol and communication data, control the entire terminal device, execute a software program, and process data of the software program, for example, configured to support the terminal device in performing the actions described in the foregoing method embodiments. The memory is mainly configured to store the software program and data. The control circuit is mainly configured to convert a baseband signal and a radio frequency signal and process the radio frequency signal. The control circuit and the antenna together may also be referred to as a transceiver, and are mainly configured to receive and send a radio frequency signal in a form of an electromagnetic wave. The input/output apparatus such as a touchscreen, a display, or a keyboard is mainly configured to: receive data entered by a user, and output data to the user.

After the terminal device is powered on, the processor may read the software program in a storage unit, explain and execute instructions of the software program, and process the data of the software program. When data needs to be sent in a wireless manner, after the processor performs baseband processing on the to-be-sent data, the processor outputs a baseband signal to a radio frequency circuit. After performing radio frequency processing on the baseband signal, the radio frequency circuit sends a radio frequency signal through an antenna in an electromagnetic wave form. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 11 shows only one memory and one processor. In an actual terminal device, there may be a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process the communication protocol and the communication data. The central processing unit is mainly configured to: control the entire terminal device, execute the software program, and process the data of the software program. Functions of the baseband processor and the central processing unit may be integrated into the processor in FIG. 11. A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, and the terminal device may include a plurality of central processing units to enhance processing capabilities of the terminal device, and components of the terminal device may be connected by using various buses. The baseband processor may also be expressed as a baseband processing circuit or a baseband processing chip. The central processing unit may also be described as a central processing circuit or a central processing chip. A function of processing the communication protocol and the communication data may be built in the processor, or may be stored in the storage unit in a form of a software program, and the processor executes the software program to implement a baseband processing function.

Figure 12:
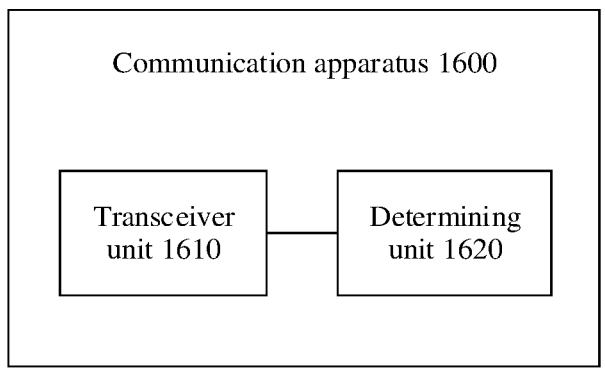
FIG. 12 is an example schematic diagram of a communication device according to another embodiment of this application.

FIG. 12 is a schematic diagram of a communication device according to an embodiment of this application. A communication apparatus 1600 shown in FIG. 12 includes a transceiver unit 1610 and a determining unit 1620.

The transceiver unit 1610 is configured to receive first indication information sent by a terminal device, where the first indication information indicates that a switching delay between a first bandwidth part BWP and a second BWP is first duration, where the first BWP and the second BWP are uplink BWPs or downlink BWPs used by the terminal device to send and receive data.

The determining unit 1620 is configured to determine, based on the second indication information, that the switching delay between the first BWP and the second BWP is the first duration.

Optionally, the first indication information includes an identifier of the first BWP, an identifier of the second BWP, and indication information of the first duration.

Optionally, the first duration is determined by the terminal device.

Optionally, the first BWP and the second BWP are any two of a plurality of downlink BWPs or a plurality of uplink BWPs configured by the communication apparatus 1600 for the terminal device in a first serving cell.

Optionally, at least one BWP in the first BWP and the second BWP is a BWP that the terminal device recommends the communication apparatus 1600 to newly configure for the terminal device in a first serving cell.

Optionally, the transceiver unit 1610 is further configured to receive second indication information sent by the terminal device, where the second indication information indicates a recommended configuration parameter of the at least one BWP.

Optionally, the transceiver unit 1610 is further configured to send a reconfiguration message to the terminal device, where the reconfiguration message is used to configure the at least one BWP for the terminal device based on the recommended configuration parameter.

Optionally, the first duration is shorter than second duration, and the second duration is a switching delay that is between the first BWP and the second BWP and that is determined based on a BWP switching delay capability type of the terminal device.

Optionally, the first duration is determined based on configuration parameters of the first BWP and the second BWP.

Optionally, the configuration parameters of the first BWP and the second BWP meet at least one of the following conditions: A difference between center frequencies of the first BWP and the second BWP is less than or equal to a first threshold; a difference between bandwidths of the first BWP and the second BWP is less than or equal to a second threshold; and a difference between subcarrier spacings of the first BWP and the second BWP is less than or equal to a third threshold.

Optionally, the transceiver unit 1610 is further configured to send an acknowledgment message to the terminal device, where the acknowledgment message indicates that the switching delay of the terminal device between the first BWP and the second BWP is the first duration.

Optionally, the first serving cell is any one of a plurality of serving cells of the terminal device, and the first indication information further includes a cell identifier of the first serving cell.

Optionally, the indication information of the first duration includes a value of the first duration or an index value of the first duration.

Optionally, the first indication information further indicates that a switching delay between a third BWP and a fourth BWP is third duration.

In another implementation, the transceiver unit 1610 is configured to receive first indication information sent by a terminal device, where the first indication information includes an identifier of a first bandwidth part BWP and indication information of a first quantity of MIMO layers, and the first BWP is an uplink BWP or a downlink BWP used by the terminal device to send and receive data in a first serving cell.

The determining unit 1620 is configured to determine, based on the first indication information, that when the first BWP is activated, the terminal device uses the first quantity of MIMO layers as a maximum quantity of MIMO layers to send and receive data.

Optionally, the first quantity of MIMO layers is less than a second quantity of MIMO layers, and the second quantity of MIMO layers is a maximum quantity of MIMO layers configured by the communication apparatus 1600 for the first serving cell.

Optionally, the first quantity of MIMO layers is less than a third quantity of MIMO layers, and the third quantity of MIMO layers is a maximum quantity of MIMO layers indicated in a capability message reported by the terminal device for the first serving cell.

Optionally, the first quantity of MIMO layers is determined based on a configuration parameter of the first BWP.

Optionally, the transceiver unit 1610 is further configured to send an acknowledgment message to the terminal device, where the acknowledgment message indicates that when the terminal device uses the first BWP, the terminal device uses the first quantity of MIMO layers as a maximum quantity of MIMO layers to send and receive data.

Optionally, the first serving cell is any one of a plurality of serving cells of the terminal device, and the first indication information further includes a cell identifier of the first serving cell.

Optionally, the first indication information includes an identifier of a second BWP and indication information of a fourth quantity of MIMO layers, and the fourth quantity of MIMO layers is a maximum quantity of MIMO layers that is determined by the terminal device and that is applicable to the second BWP.

In another implementation, the transceiver unit 1610 is configured to receive first indication information sent by a terminal device, where the first indication information indicates recommended configuration parameters of N BWPs, the recommended configuration parameters of the N BWPs are determined based on first duration and configuration parameters of M BWPs, and the M BWPs are BWPs configured by the communication apparatus for the terminal device in a first serving cell, and M and N are integers greater than or equal to 1.

The transceiver unit 1610 is further configured to receive second indication information sent by the terminal device, where the second indication information indicates that a switching delay between a first BWP and a second BWP is the first duration, and at least one of the first BWP and the second BWP is a BWP newly configured by the communication apparatus 1600 for the terminal device in the first serving cell based on the recommended configuration parameters of the N BWPs.

The determining unit 1620 is configured to determine, based on the second indication information, that the switching delay of the terminal device between the first BWP and the second BWP is the first duration.

Optionally, the transceiver unit 1610 is further configured to send an acknowledgment message to the terminal device, where the acknowledgment message indicates that the switching delay of the terminal device between the first BWP and the second BWP is the first duration.

Optionally, the transceiver unit 1610 is further configured to send a reconfiguration message to the terminal device, where the reconfiguration message is used to configure the at least one BWP for the terminal device based on the recommended configuration parameters of the N BWPs.

Optionally, the acknowledgment message includes the reconfiguration message.

Optionally, the recommended configuration parameters of the N BWPs include bandwidth information and center frequency information of the N BWPs.

Optionally, the recommended configuration parameters of the N BWPs include resource indication values corresponding to the N BWPs.

Optionally, the first indication information includes a configuration parameter of a reference BWP, and the recommended configuration parameters include an offset relative to the configuration parameter of the reference BWP.

In a possible implementation, the communication apparatus 1600 may be a network device, for example, a base station 80 described below. A function of the determining unit may be implemented by a processor 8022 in the base station, and a function of the transceiver unit may be implemented by using an RRU 801 in the base station 80. The following describes a structure of a network device in an embodiment of this application with reference to FIG. 13.

Figure 13:
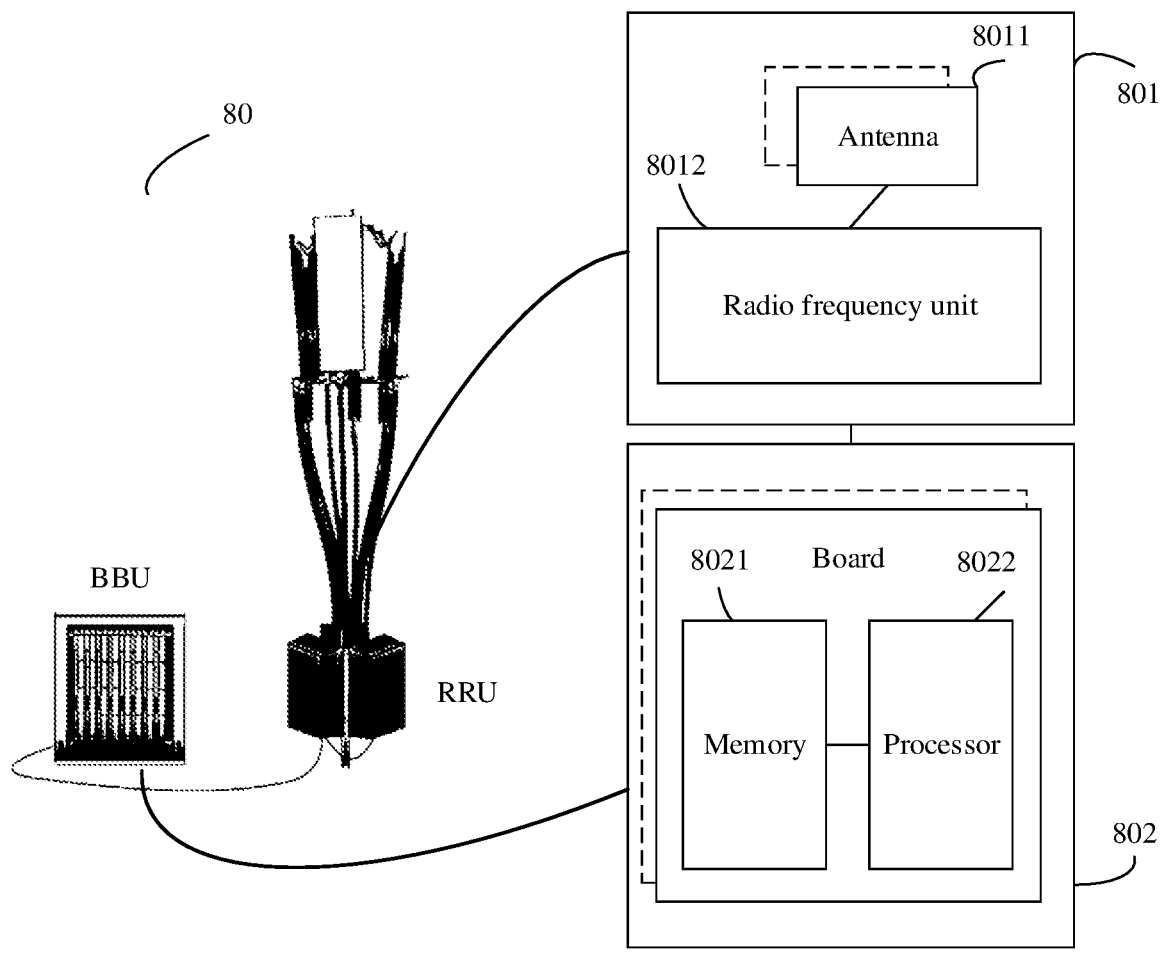
FIG. 13 is an example schematic diagram of a structure of a network device according to an embodiment of this application.

FIG. 13 is a schematic diagram of a structure of a network device according to an embodiment of this application, for example, may be a schematic diagram of a structure of a base station. As shown in FIG. 13, the base station may be applied to the system shown in FIG. 1, to perform a function of the network device in the foregoing method embodiments. The base station 80 may include one or more radio frequency units such as a remote radio unit (RRU) 801 and one or more baseband units (BBU) (which may also be referred to as a digital unit (DU)) 802. The RRU 801 may be referred to as a transceiver unit, a transceiver machine, a transceiver circuit, a transceiver, or the like, and may include at least one antenna 8011 and a radio frequency unit 8012. The RRU 801 is mainly configured to: send and receive a radio frequency signal, and perform conversion between the radio frequency signal and a baseband signal, for example, configured to send the signaling message in the foregoing embodiments to a terminal device. The BBU 802 is mainly configured to: perform baseband processing, control the base station, and the like. The RRU 801 and the BBU 802 may be physically disposed together, or may be physically separated, that is, in a distributed base station.

The BBU 802, also referred to as a processing unit, is a control center of the base station, and is mainly configured to complete baseband processing functions such as channel coding, multiplexing, modulation, and spectrum spreading. For example, the BBU (e.g., the processing unit) 802 may be configured to control the base station to perform an operation procedure related to the network device in the foregoing method embodiments.

In an example, the BBU 802 may include one or more boards. A plurality of boards may jointly support a radio access network (such as an LTE network) of a single access standard, or may respectively support radio access networks (such as an LTE network, a 5G network, or another network) of different access standards. The BBU 802 further includes a memory 8021 and a processor 8022. The memory 8021 is configured to store a necessary instruction and necessary data. For example, the memory 8021 stores a correspondence between a codebook index and a precoding matrix in the foregoing embodiments. The processor 8022 is configured to control the base station to perform a necessary action, for example, is configured to control the base station to perform the operation procedure related to the network device in the foregoing method embodiments. The memory 8021 and the processor 8022 may serve one or more boards. In other words, the memory and the processor may be separately disposed on each board. Alternatively, a plurality of boards may share a same memory and a same processor. In addition, a necessary circuit may be further disposed on each board.

It should be understood that the processor in the embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It should be further understood that the memory in the embodiments of this application may be a volatile memory or a nonvolatile memory, or may include a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through an example rather than a limitative description, random access memories in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

According to the method provided in the embodiments of this application, this application further provides a computer program product. The computer program product includes computer program code. When the computer program code is run on a computer, the computer is enabled to perform the method according to any one of the embodiments shown in FIG. 4 to FIG. 9.

According to the method provided in the embodiment of this application, this application further provides a computer-readable medium. The computer-readable medium stores program code. When the program code is run on a computer, the computer is enabled to perform the method in any one of the embodiments shown in FIG. 4 to FIG. 9.

According to the method provided in the embodiments of this application, this application further provides a system. The system includes the foregoing one or more terminal devices and the foregoing one or more network devices.

All or some of the foregoing embodiments may be implemented by software, hardware, firmware, or any combination thereof. When the software is used to implement the embodiments, all or some of the foregoing embodiments may be implemented in a form of a computer program product. The computer program product includes one or more computer instructions or computer programs. When the program instructions or the computer programs are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

For ease of understanding, the following describes terms used in a process of describing the solutions in this application.

In the embodiments of this application, the "indication" may include a direct indication and an indirect indication, or may include an explicit indication and an implicit indication. Information indicated by using a piece of information (for example, the indication information described above) is referred to as to-be-indicated information. In a specific implementation process, the to-be-indicated information is indicated in a plurality of manners, for example, but not limited to, a manner of directly indicating the to-be-indicated information. For example, the to-be-indicated information is indicated by using the to-be-indicated information or an index of the to-be-indicated information. Alternatively, the to-be-indicated information may be indirectly indicated by indicating other information, where an association relationship exists between the other information and the to-be-indicated information. Alternatively, only a part of the to-be-indicated information may be indicated, and another part of the to-be-dated information is known or agreed in advance. For example, specific information may further be indicated based on a pre-agreed (for example, a protocol specified) arrangement order of all information, to reduce indication overheads to some extent.

In the embodiments of this application, terms and English abbreviations, such as bandwidth part (BWP), multiple-input multiple-output (MIMO), downlink control information (DCI), media access control control element (MAC CE), radio resource control (RRC), and physical downlink shared channel (PDSCH), and the like are all examples provided for ease of description, and should not constitute any limitation on this application. This application does not exclude a possibility of defining another term that can implement a same or similar function in an existing or a future protocol.

In the embodiments of this application, "first", "second", and various numeric numbers are merely used for distinguishing for ease of description and are not intended to limit the scope of the embodiments of this application. For example, different BWPs, segments of duration, thresholds, quantities of MIMO layers, indication information, and the like are distinguished.

In the embodiments of this application, the "communication protocol" may be a standard protocol in the communication field, for example, may include an LTE protocol, an NR protocol, and a related protocol applied to a future communication system. This is not limited in this application.

The term "and/or" in this specification describes only an association relationship for describing associated objects and indicates that there may be at least three relationships. For example, A and/or B may indicate the following three cases: Only A exists, both A and B exist, and only B exists. In addition, the character "/" in this specification usually indicates an "or" relationship between the associated objects.

Sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments.

In the several embodiments provided in this application, it should be understood that the disclosed system, apparatus, and method may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual coupling or direct coupling or communication connections may be implemented by using some interfaces. The indirect coupling or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, functional units in the embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   sending, by a terminal device, first indication information to a network device, wherein the first indication information indicates a switching delay between a first bandwidth part (BWP) and a second BWP is of a first duration, wherein
   the first BWP and the second BWP include uplink BWPs or downlink BWPs used by the terminal device to send and receive data,
   at least one BWP, in the first BWP and the second BWP, is recommended by the terminal device, for the network device to configure for the terminal device, in a first serving cell, and
   the method further comprises:
      sending, by the terminal device, second indication information to the network device, wherein the second indication information indicates a recommended configuration parameter of the at least one BWP.

2. The communication method according to claim 1, wherein the first indication information comprises a first identifier of the first BWP, a second identifier of the second BWP, and indication information of the first duration.

3. The communication method according to claim 1, further comprising:
   receiving, by the terminal device, a reconfiguration message from the network device, wherein the reconfiguration message is used to configure the at least one BWP for the terminal device based on the recommended configuration parameter.

4. The communication method according to claim 1, wherein the first duration is shorter than a second duration, and the second duration includes a switching delay between the first BWP and the second BWP, wherein the switching delay is determined based on a BWP switching delay capability type of the terminal device.

5. A communication method, comprising:
   receiving, by a network device, first indication information from a terminal device, wherein the first indication information indicates a switching delay between a first bandwidth part (BWP) and a second BWP is of a first duration, wherein
   the first BWP and the second BWP include uplink BWPs or downlink BWPs used by the terminal device to send and receive data,
   at least one BWP, in the first BWP and the second BWP, is recommended by the terminal device, for the network device to configure for the terminal device, in a first serving cell, and
   the method further comprises:
      receiving, by the network device, second indication information from the terminal device, wherein the second indication information indicates a recommended configuration parameter of the at least one BWP.

6. The communication method according to claim 1, wherein the first duration includes any of: a time length and/or a plurality of slots.

7. The communication method according to claim 5, wherein the first indication information comprises a first identifier of the first BWP, a second identifier of the second BWP, and indication information of the first duration.

8. The communication method according to claim 5, further comprising:
   sending, by the network device, a reconfiguration message to the terminal device, wherein the reconfiguration message is used to configure the at least one BWP for the terminal device based on the recommended configuration parameter.

9. The communication method according to claim 5, wherein the first duration is shorter than a second duration, and the second duration includes a switching delay between the first BWP and the second BWP, wherein the switching delay is determined based on a BWP switching delay capability type of the terminal device.

10. A communication apparatus, comprising:
    a processor; and
    a memory configured to store computer readable instructions that, when executed by the processor, cause the communication apparatus to:
       send first indication information to a network device, wherein the first indication information indicates a switching delay between a first bandwidth part (BWP) and a second BWP is of a first duration, wherein
    the first BWP and the second BWP include uplink BWPs or downlink BWPs used by the communication apparatus to send and receive data,
    at least one BWP, in the first BWP and the second BWP, is recommended by the communication apparatus, for the network device to configure for the communication apparatus, in a first serving cell, and the communication apparatus is further caused to:
send second indication information to the network device, wherein the second indication information indicates a recommended configuration parameter of the at least one BWP.

11. The communication apparatus according to claim 10, wherein the first indication information comprises a first identifier of the first BWP, a second identifier of the second BWP, and indication information of the first duration.

12. The communication apparatus according to claim 10, wherein the communication apparatus is further caused to:
receive a reconfiguration message from the network device, wherein the reconfiguration message is used to configure the at least one BWP for the communication apparatus based on the recommended configuration parameter.

13. The communication apparatus according to claim 10, wherein the first duration is shorter than a second duration, and the second duration includes a switching delay between the first BWP and the second BWP, wherein the switching delay is determined based on a BWP switching delay capability type of the communication apparatus.

14. A communication apparatus, comprising:
a processor; and
a memory configured to store computer readable instructions that, when executed by the processor, cause the communication apparatus to:
receive first indication information from a terminal device, wherein the first indication information indicates a switching delay between a first bandwidth part (BWP) and a second BWP is of a first duration, wherein
the first BWP and the second BWP include uplink BWPs or downlink BWPs used by the terminal device to send and receive data,
at least one BWP, in the first BWP and the second BWP, is recommended by the terminal device, for the communication apparatus to configure for the terminal device, in a first serving cell, and
the communication apparatus is further caused to:
receive second indication information from the terminal device, wherein the second indication information indicates a recommended configuration parameter of the at least one BWP.

15. The communication apparatus according to claim 14, wherein the first indication information comprises a first identifier of the first BWP, a second identifier of the second BWP, and indication information of the first duration.

16. The communication apparatus according to claim 14, wherein
the communication apparatus is further caused to:
send a reconfiguration message to the terminal device, wherein the reconfiguration message is used to configure the at least one BWP for the terminal device based on the recommended configuration parameter.

17. The communication apparatus according to claim 14, wherein the first duration is shorter than a second duration, and the second duration includes a switching delay between the first BWP and the second BWP, wherein the switching delay is determined based on a BWP switching delay capability type of the terminal device.

* * * * *